US008421968B2

(12) United States Patent
Ino

(10) Patent No.: US 8,421,968 B2
(45) Date of Patent: Apr. 16, 2013

(54) LIQUID CRYSTAL DISPLAY APPARATUS AND ELECTRONIC APPARATUS

(75) Inventor: Masumitsu Ino, Kanagawa (JP)

(73) Assignee: Sony Corporation, Tokyo (JP)

( * ) Notice: Subject to any disclaimer, the term of this patent is extended or adjusted under 35 U.S.C. 154(b) by 692 days.

(21) Appl. No.: 11/850,323

(22) Filed: Sep. 5, 2007

(65) Prior Publication Data

US 2008/0055526 A1    Mar. 6, 2008

(30) Foreign Application Priority Data

Sep. 6, 2006   (JP) ................................ 2006-241355

(51) Int. Cl.
*G02F 1/1335* (2006.01)
*G02F 1/1333* (2006.01)
*G02F 1/1343* (2006.01)

(52) U.S. Cl.
USPC ............................. 349/114; 349/138; 349/141

(58) Field of Classification Search .................. 349/114, 349/138, 141
See application file for complete search history.

(56) References Cited

U.S. PATENT DOCUMENTS

| 2001/0052948 | A1* | 12/2001 | Okamoto et al. | 349/12 |
| 2005/0128389 | A1* | 6/2005 | Yang | 349/114 |
| 2005/0190324 | A1* | 9/2005 | Yang | 349/114 |
| 2006/0256268 | A1* | 11/2006 | Jeong et al. | 349/141 |
| 2006/0279677 | A1* | 12/2006 | Matsushima | 349/114 |
| 2007/0146591 | A1* | 6/2007 | Kimura et al. | 349/114 |
| 2007/0263148 | A1* | 11/2007 | Teramoto et al. | 349/117 |

FOREIGN PATENT DOCUMENTS

| JP | 09-090424 | 4/1997 |
| JP | 10-213808 | 8/1998 |
| JP | 2001-042366 | 2/2001 |
| JP | 2002-229032 | 8/2002 |
| JP | 2005-524115 | 11/2005 |
| JP | 2005-338264 | 12/2005 |
| JP | 2005-358256 | 12/2005 |
| JP | 2006-003808 | 1/2006 |
| JP | 2006-003908 | 1/2006 |
| JP | 2006-071977 | 3/2006 |
| JP | 2006-091930 | 4/2006 |
| JP | 2006-276110 | 10/2006 |
| JP | 2007-017943 | 1/2007 |
| WO | 2005-006068 | 1/2005 |

OTHER PUBLICATIONS

Japanese Office Action dated Jul. 1, 2008 for Application No. 2006-241355.
Japanese Office Action issued on May 10, 2011 in connection with counterpart JP Application No. 2008-223165.

* cited by examiner

*Primary Examiner* — Edward Glick
*Assistant Examiner* — Dennis Y Kim
(74) *Attorney, Agent, or Firm* — SNR Denton US LLP

(57) ABSTRACT

Disclosed herein is a liquid crystal display apparatus in which a transmission region and a reflection region disposed in parallel. The apparatus includes first and second substrates and a liquid crystal layer disposed between the first and second substrates. The second substrate has at least a counter electrode, an interlayer insulating film and a pixel electrode for forming a fringe field for driving molecules of the liquid crystal. At least one parameter relating to the interlayer insulating film formed on the second substrate is set different between the transmission region side interlayer insulating film and the reflection region side interlayer insulating film so that driving voltages for the transmission and reflection regions are substantially equal to each other.

9 Claims, 20 Drawing Sheets

FIG.6

| VLcd(V) | ε:VACUUM DIELECTRIC CONSTANT(F/cm) | ε∥ | ε⊥ | K:ELASTIC CONSTANT(N) | L:LINE DISTANCE(μm) | D:GAP(μm) |
|---|---|---|---|---|---|---|
| 1.71E-01 | 8.85E-14 | 14 | 4 | 1.52-11 | 0.0375 | 4.5 |
| 2.29E-01 | 8.85E-14 | 14 | 4 | 1.52-11 | 0.05 | 4.5 |
| 3.43E-01 | 8.85E-14 | 14 | 4 | 1.52-11 | 0.075 | 4.5 |
| 6.86E-01 | 8.85E-14 | 14 | 4 | 1.52-11 | 0.15 | 4.5 |
| 1.37E+00 | 8.85E-14 | 14 | 4 | 1.52-11 | 0.3 | 4.5 |
| 2.74E+00 | 8.85E-14 | 14 | 4 | 1.52-11 | 0.6 | 4.5 |
| 3.66E+00 | 8.85E-14 | 14 | 4 | 1.52-11 | 0.8 | 4.5 |
| 4.57E+00 | 8.85E-14 | 14 | 4 | 1.52-11 | 1 | 4.5 |
| 9.14E+00 | 8.85E-14 | 14 | 4 | 1.52-11 | 2 | 4.5 |
| 1.37E+01 | 8.85E-14 | 14 | 4 | 1.52-11 | 3 | 4.5 |
| 1.83E+01 | 8.85E-14 | 14 | 4 | 1.52-11 | 4 | 4.5 |
| 4.57E+00 | 8.85E-14 | 14 | 4 | 1.52-11 | 1 | 4.5 |
| 4.57E+00 | 8.85E-14 | 14 | 4 | 1.52-11 | 1 | 4.5 |
| 1.83E-01 | 8.85E-14 | 14 | 14 | 1.52-11 | 0.0375 | 2.25 |
| 4.57E-01 | 8.85E-14 | 14 | 4 | 1.52-11 | 0.05 | 2.25 |
| 6.86E-01 | 8.85E-14 | 14 | 4 | 1.52-11 | 0.075 | 2.25 |
| 1.37E+00 | 8.85E-14 | 14 | 4 | 1.52-11 | 0.15 | 2.25 |
| 2.74E+00 | 8.85E-14 | 14 | 4 | 1.52-11 | 0.3 | 2.25 |
| 5.49E+00 | 8.85E-14 | 14 | 4 | 1.52-11 | 0.6 | 2.25 |
| 7.32E+00 | 8.85E-14 | 14 | 4 | 1.52-11 | 0.8 | 2.25 |
| 9.14E+00 | 8.85E-14 | 14 | 4 | 1.52-11 | 1 | 2.25 |
| 4.12E-01 | 8.85E-14 | 14 | 14 | 1.52-11 | 0.0375 | 1 |
| 1.03E+00 | 8.85E-14 | 14 | 4 | 1.52-11 | 0.05 | 1 |
| 1.54E+00 | 8.85E-14 | 14 | 4 | 1.52-11 | 0.075 | 1 |
| 3.09E+00 | 8.85E-14 | 14 | 4 | 1.52-11 | 0.15 | 1 |
| 6.17E+00 | 8.85E-14 | 14 | 4 | 1.52-11 | 0.3 | 1 |
| 1.23E+01 | 8.85E-14 | 14 | 4 | 1.52-11 | 0.6 | 1 |
| 1.65E+01 | 8.85E-14 | 14 | 4 | 1.52-11 | 0.8 | 1 |
| 2.06E+01 | 8.85E-14 | 14 | 4 | 1.52-11 | 1 | 1 |
| 2.20E-01 | 8.85E-14 | 14 | 4 | 1.52-11 | 0.075 | 7 |
| 4.41E-01 | 8.85E-14 | 14 | 4 | 1.52-11 | 0.15 | 7 |
| 8.82E-01 | 8.85E-14 | 14 | 4 | 1.52-11 | 0.3 | 7 |
| 1.76E+00 | 8.85E-14 | 14 | 4 | 1.52-11 | 0.6 | 7 |
| 2.35E+00 | 8.85E-14 | 14 | 4 | 1.52-11 | 0.8 | 7 |
| 2.94E+00 | 8.85E-14 | 14 | 4 | 1.52-11 | 1 | 7 |
| 5.88E+00 | 8.85E-14 | 14 | 4 | 1.52-11 | 2 | 7 |
| 8.82E+00 | 8.85E-14 | 14 | 4 | 1.52-11 | 3 | 7 |
| 1.18E+01 | 8.85E-14 | 14 | 4 | 1.52-11 | 4 | 7 |
| 1.47E+01 | 8.85E-14 | 14 | 4 | 1.52-11 | 5 | 7 |

FIG.13

RESULT

| | VLcd(V) | ε VACUUM DIELECTRIC CONSTANT(F/cm) | ε_ | K:ELASTIC CONSTANT(N) | L:LINE DISTANCE(μm) | D:GAP(μm) |
|---|---|---|---|---|---|---|
| t1 SiN | 3.67E+00 | 8.85E-14 | 7.5 | 1.52E-11 | 1.1 | 4.5 |
| t2 SiO2 | 3.70E+00 | 8.85E-14 | 3.9 | 1.52E-11 | 0.4 | 2.25 | t1 = 1μm t2 = 0.7μm

WHERE t1 AND t2 ARE FILM THICKNESSES, ε1 AND ε2 ARE ADJUSTED TO MAKE DRIVING VOLTAGES ON THE TRANSMISSION SIDE AND THE REFLECTION SIDE EQUAL TO EACH OTHER

FIG. 16

RESULT

| | VLcd(V) | ε VACUUM DIELECTRIC CONSTANT(F/cm) | ε_ | K:ELASTIC CONSTANT(N) | L:LINE DISTANCE(μm) | D:GAP(μm) |
|---|---|---|---|---|---|---|
| t1 SiO$_2$ | 3.47E+00 | 8.85E-14 | 3.9 | 1.52E-11 | 0.5 | 3 |
| t2 TaO$_2$ | 4.39E+00 | 8.85E-14 | 22 | 1.52E-11 | 1 | 2 | t1 = 0.5μm  t2 = 1μm)

WHERE t1 AND t2 ARE FILM THICKNESSES, ε1 AND ε2 ARE ADJUSTED TO MAKE DRIVING VOLTAGES ON THE TRANSMISSION SIDE AND THE REFLECTION SIDE EQUAL TO EACH OTHER MOREOVER, THE SECOND INTERLAYER INSLATING FILM ALSO WORKS AS AN OFFSET PORTION FOR GAP CONTROL IN THE REFLECTION REGION.

LIQUID CRYSTAL DISPLAY APPARATUS AND ELECTRONIC APPARATUS

CROSS REFERENCES TO RELATED APPLICATIONS

The present invention contains subject matter related to Japanese Patent Application JP 2006-241355, filed in the Japan Patent Office on Sep. 6, 2006, the entire contents of which being incorporated herein by reference.

BACKGROUND OF THE INVENTION

1. Field of the Invention

This invention relates to a liquid crystal display apparatus and an electronic apparatus wherein, for example, both of reflective type display and transmissive type display are used.

2. Description of the Related Art

A liquid crystal display apparatus is used as a display apparatus for various electronic apparatus making the most of the characteristics of a small thickness and lower power consumption. In particular, a liquid crystal display apparatus is used, for example, as a display apparatus of a notebook type personal computer or a car navigation system or employed in various other electronic apparatus such as a portable digital assistant (PDA), a portable telephone set, a digital camera or a video camera.

Liquid crystal apparatus are roughly divided into two types including a transmissive type and a reflective type. In a liquid crystal display apparatus of the transmissive type, light from an internal light source called backlight is controlled between transmission and interception by a liquid crystal panel to display an image. On the other hand, in a liquid crystal display apparatus of the reflective type, external light such as sunlight is reflected by a reflecting plate or the like and the reflected light is controlled between transmission and interception by a liquid crystal panel to display an image.

In a transmissive type liquid crystal display apparatus, the backlight consumes power by more than 50% the total power consumption of the apparatus, and it is difficult to reduce the power consumption. The transmissive type liquid crystal display apparatus has a problem also in that, where the surroundings are light, the display looks dark and therefore the visibility is low.

On the other hand, in a reflective type liquid crystal display apparatus, since it does not include a backlight, it does not have the problem of high power consumption. However, it has another problem in that, where the surroundings are dark, the visibility is very low.

In order to eliminate the problems of both of transmissive and reflective type display apparatus, a liquid crystal display apparatus of the reflective and transmissive type which implements both of transmissive type display and reflective type display using a single liquid crystal panel has been proposed. The reflective and transmissive type liquid crystal display apparatus makes use of reflection of ambient light for display when the surroundings are light, but makes use of light of a backlight for display when the surroundings are dark.

Incidentally, various liquid crystal display apparatus which make use of IPS (In Plain Switching) or FFS (Fringe Field Switching) have been proposed in order to assure a wide angular field of view. Such liquid crystal display apparatus are disclosed, for example, in Japanese Patent Laid-open Nos. 2002-229032 (hereinafter referred to as Patent Document 1), 2001-42366 (hereinafter referred to as Patent Document 2), 2005-338256 (hereinafter referred to as Patent Document 3), 2005-338264 (hereinafter referred to as Patent Document 4), 2006-71977 (hereinafter referred to as Patent Document 5) and 2005-524115 (hereinafter referred to as Patent Document 6).

SUMMARY OF THE INVENTION

Incidentally, a liquid crystal display apparatus of a transreflective type which can act as an apparatus of both of the transmissive type and the reflective type has many subjects A representative one of the subjects is to make the driving voltages for liquid crystal in a transmission region and a reflection region equal to each other.

Usually, in ECB liquid crystal or VA liquid crystal which is driven by a voltage generated between an upper electrode and a lower electrode, since the liquid crystal is varied by a vertical voltage, no difference appears in driving voltages for the transmission region and the reflection region.

However, in a reflective type liquid crystal structure of the FFS type or the IPS type, it is known that the following relationship is satisfied:

$$Vlcd = \pi \cdot L/D\sqrt{(K/\in lcd)} \qquad (1)$$

where Vlcd is the driving voltage for the liquid crystal, L the interlayer insulating film thickness or line distance, D the liquid crystal thickness (gap), K the viscosity constant of the liquid crystal, and $\in lcd$ the relative dielectric constant of the liquid crystal.

For example, in the reflective and transmissive type liquid crystal display apparatus disclosed in Patent Document 3 or 4, a multi-gap structure is adopted wherein the gap in the reflection region by a circular polarization method is one half the gap in the transmission region.

Therefore, from the liquid crystal gap D of the expression (1) above, a doubled driving voltage is required. In other words, different driving voltages are required for the transmission region and the reflection region. Therefore, a complicated driving method and complicated circuit design are required.

Further, the liquid crystal display apparatus disclosed in Patent Documents 1 to 6 have the following disadvantages.

The liquid crystal display apparatus disclosed in Patent Documents 1 and 2 adopt a structure that a reflector is provided below a substrate for pixel electrodes and counter electrodes of the FFS structure. Thus, since the liquid crystal display apparatus are not designed for use as a display apparatus of the transmissive type, they cannot be structured for use as a display apparatus of both of the transmissive type and the reflective type.

The liquid crystal display apparatus disclosed in Patent Document 3 is of the transmissive and reflective type which utilizes both of transmission and reflection and uses a built-in phase plate. However, the liquid crystal display apparatus does not include measures for adjusting the driving voltage for the transmissive type and the driving voltage for the reflective type. Therefore, the driving voltage cannot be optimized between transmission and reflection.

The liquid crystal display apparatus disclosed in Patent Document 4 makes the electrode pattern different between the reflection region and the transmission region to generate a phase difference direction of λ/4 to carry out display in the transmission mode and the reflection mode.

However, similarly to the liquid crystal display apparatus described above, the liquid crystal display apparatus of Patent Document 4 does not include measures for adjusting the driving voltages for the reflection and the transmission. Therefore, the driving voltage cannot be optimized for both of transmission and reflection.

The liquid crystal display apparatus disclosed in Patent Documents 5 and 6 are of the transmissive and reflective type which utilizes both of transmission and reflection. However, the liquid crystal display apparatus do not include measures for adjusting the driving voltage between transmission and reflection.

Therefore, it is demanded to provide a liquid crystal display apparatus and an electronic apparatus wherein liquid crystal is driven by a single driving voltage without requiring a complicated driving method or driving circuit.

According to an embodiment of the present invention, there is provided a liquid crystal display apparatus wherein a transmission region and a reflection region are disposed in parallel. The apparatus includes a first substrate, a second substrate, and a liquid crystal layer disposed between the first and second substrates. The second substrate has at least a counter electrode, an interlayer insulating film and a pixel electrode configured to form a fringe field for driving molecules of the liquid crystal. At least one parameter relating to the interlayer insulating film formed on the second substrate is different between the transmission region side interlayer insulating film and the reflection region side interlayer insulating film so that driving voltages for the transmission region and the reflection region are substantially equal to each other.

According to another embodiment of the present invention, there is provided an electronic apparatus includes a liquid crystal display apparatus wherein a transmission region and a reflection region are disposed in parallel. The liquid crystal display apparatus includes a first substrate, a second substrate, and a liquid crystal layer disposed between the first and second substrates. The second substrate has at least a counter electrode, an interlayer insulating film and a pixel electrode configured to form a fringe field for driving molecules of the liquid crystal. At least one parameter relating to the interlayer insulating film formed on the second substrate is different between the transmission region side interlayer insulating film and the reflection region side interlayer insulating film so that driving voltages for the transmission region and the reflection region are substantially equal to each other.

In the liquid crystal display apparatus and the electronic apparatus, the parameter of the interlayer insulating film on the second substrate side such as the film thickness or the relative dielectric constant with which the driving voltages for the transmission region and the reflection region become substantially equal to each other is set so as to be different between the transmission region and the reflection region.

With the liquid crystal display apparatus and the electronic apparatus, a single driving voltage for liquid crystal can be used for the transmission region and the reflection region without using a complicated driving method or driving circuit.

The above and other features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 6 is a table illustrating liquid crystal driving voltages and parameters used in the liquid crystal display apparatus of FIG. 4;

FIG. 13 is a table illustrating an example of particular numerical values used in the liquid crystal display apparatus of FIG. 12;

FIG. 16 is a table illustrating an example of particular numerical values used in the liquid crystal display apparatus of FIG. 14;

DETAILED DESCRIPTION OF THE PREFERRED EMBODIMENTS

Before liquid crystal display apparatus according to preferred embodiments of the present invention are described, a basic configuration and functions of a liquid crystal display apparatus to which the present invention is applied are described in order to facilitate understanding of the present invention.

Figure 1:
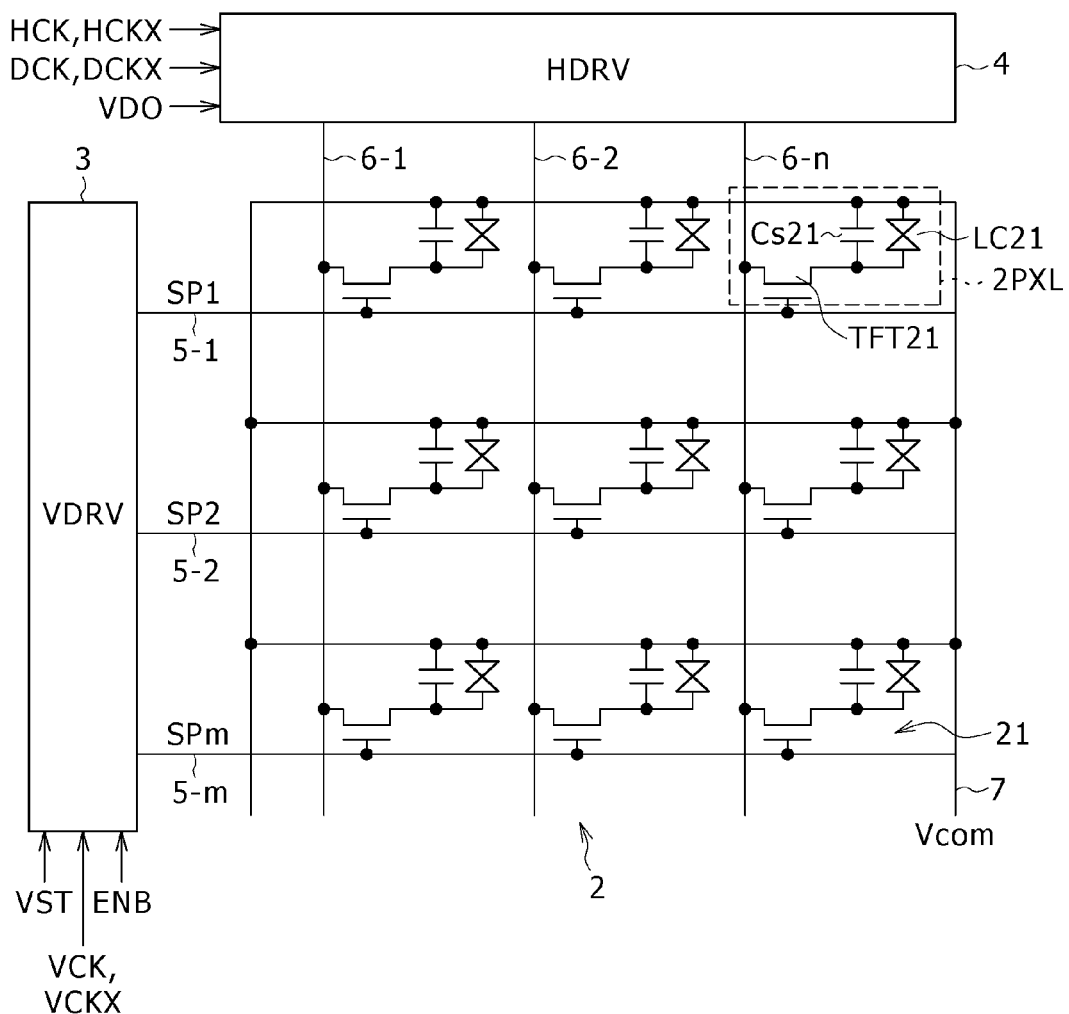
FIG. 1 is a block diagram showing an example of a configuration of a liquid crystal display apparatus to which the present invention is applied.

FIG. 1 shows an example of a configuration of a liquid crystal display apparatus to which the present invention is applied.

Referring to FIG. 1, the liquid crystal display apparatus 1 shown includes an effective pixel region section 2, a vertical driving circuit (VDRV) 3 and a horizontal driving circuit (HDRV) 4.

The effective pixel region section 2 includes a plurality of pixel sections 2PXL disposed in a matrix.

Each pixel section 2PXL includes a thin film transistor (TFT) 21 serving as a switching element, a liquid crystal cell LC21 having a pixel electrode connected to the drain electrode or the source electrode of the TFT 21, and a holding capacitor Cs21 having an electrode connected to the drain electrode of the TFT 21.

Scanning lines 5-1 to 5-*m* extend in a pixel array direction along different rows while signal lines 6-1 to 6-*n* extend in another pixel array direction along different columns of the pixel sections 2PXL.

The gate electrodes of the TFTs 21 of the pixel sections 2PXL are connected to the same one of the scanning lines (gate lines) 5-1 to 5-*m* in a unit of a row. Meanwhile, the source electrodes or the drain electrodes of the pixel sections 2PXL are connected to the same one of the signal lines 6-1 to 6-*n* in a unit of a column.

Further, in a general liquid crystal display apparatus, a holding capacitor wiring line Cs is wired independently, and a holding capacitor Cs21 is connected between the holding capacitor wiring line Cs and a connection electrode.

For example, a predetermined dc voltage is applied as a common voltage VCOM to the counter electrode of the liquid crystal cell LC21 and the other electrode of the holding capacitor Cs21 of the pixel section 2PXL through a common wiring line 7.

Or, a common voltage VCOM whose polarity reverses, for example, after each one horizontal scanning period (1H) is applied to the counter electrode of the liquid crystal cell LC21 and the other electrode of the holding capacitor Cs21 of each pixel section 2PXL.

The scanning lines 5-1 to 5-*m* are driven by the vertical driving circuit 3, and the signal lines 6-1 to 6-*n* are driven by the horizontal driving circuit 4.

The TFT 21 is a switching element for selecting a pixel to be used for display and supplying a display signal to a display region of the pixel.

Figure 2:
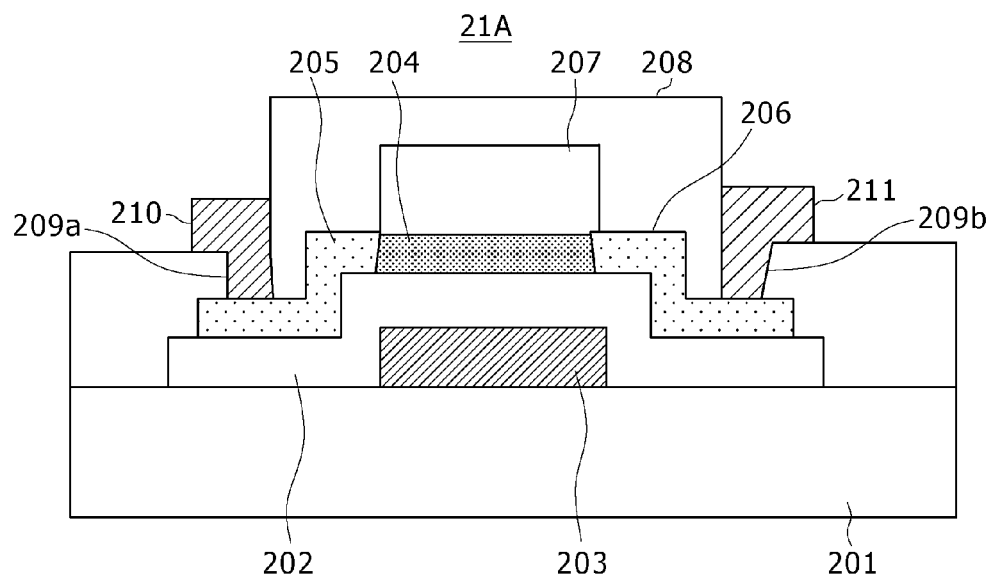
FIG. 2 is a schematic sectional view showing a TFT of a bottom gate structure.
Figure 3:
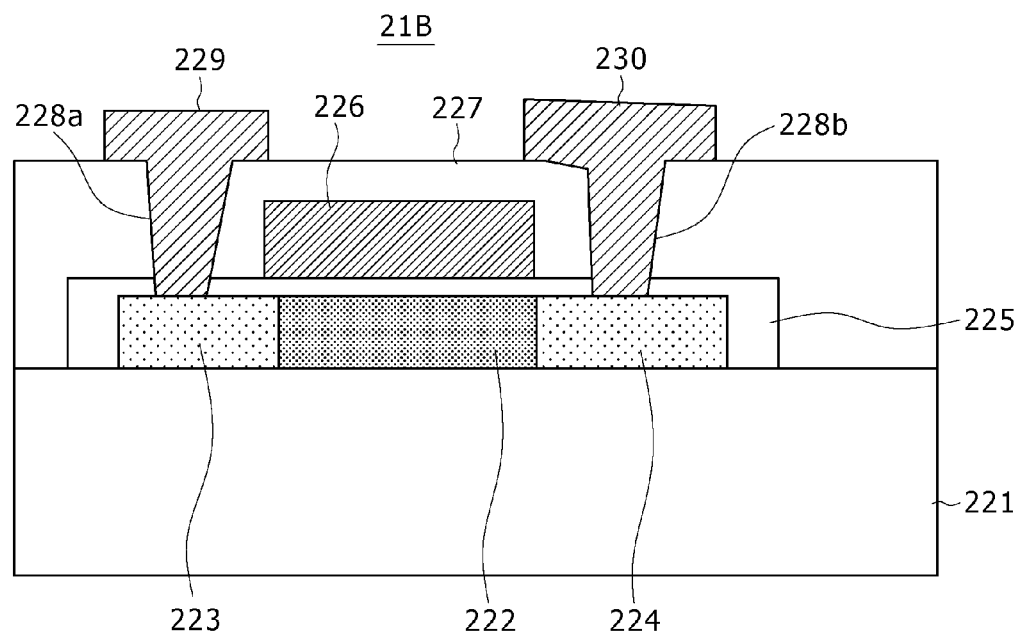
FIG. 3 is a schematic sectional view showing a TFT of a top gate structure.

The TFT 21 has, for example, such a bottom gate structure as shown in FIG. 2 or such a top gate structure as shown in FIG. 3.

Referring first to FIG. 2, the TFT 21A of the bottom gate structure shown includes a gate electrode 203 formed on a transparent insulating substrate 201, which may be a glass substrate, and covered with a gate insulating film 202. The gate electrode 203 is connected to a scanning line (gate line) 5 such that a scanning signal is inputted from the scanning line 5 to the gate electrode 203 so that the TFT 21A is turned on or off in response to the scanning signal. The gate electrode is formed by such a method as, for example, sputtering or the like of a metal or an alloy of molybdenum (Mo) or tantalum (Ta).

The TFT 21A includes a semiconductor film (channel formation region) 204 formed on the gate insulating film 202 and further includes a pair of $n^+$ diffused layers 205 and 206 formed across the semiconductor film 204. An interlayer insulating film 207 is formed on the semiconductor film 204, and another interlayer insulating film 208 is formed in such a manner as to cover the transparent insulating substrate 201, gate insulating film 202, $n^+$ diffused layers 205 and 206 and interlayer insulating film 207.

A source electrode 210 is connected to the $n^+$ diffused layer 205 through a contact hole 209*a* formed in the interlayer insulating film 208, and a drain electrode 211 is connected to the $n^+$ diffused layer 206 through another contact hole 209*b* formed in the interlayer insulating film 208.

The source electrode 210 and the drain electrode 211 are formed, for example, by patterning aluminum (Al). A signal line 6 is connected to the source electrode 210, and the drain electrode 211 is connected to the pixel region (pixel electrode) through a connection electrode not shown.

Referring now to FIG. 3, the TFT 21B of the top gate structure includes a semiconductor film (channel formation region) 222 formed on a transparent insulating substrate 221 which may be a glass substrate. The TFT 21B further includes a pair of $n^+$ diffused layers 223 and 224 formed on the transparent insulating substrate 221 across the semiconductor film 222. Further, a gate insulating film 225 is formed in such a manner as to cover the semiconductor film 222 and the $n^+$ diffused layers 223 and 224, and a gate electrode 226 is formed on the gate insulating film 225 in an opposing relationship to the semiconductor film 222. Further, another interlayer insulating film 227 is formed so as to cover the transparent insulating substrate 221, gate insulating film 225 and gate electrode 226.

A source electrode 229 is connected to the $n^+$ diffused layer 223 through a contact hole 228*a* formed in the interlayer insulating film 227 and the gate insulating film 225. A drain electrode 230 is connected to the $n^+$ diffused layer 224 through another contact hole 228*b* formed in the interlayer insulating film 227 and the gate insulating film 225.

Referring back to FIG. 1, the vertical driving circuit 3 receives a vertical start signal VST, a vertical clock VCK and an enable signal ENB and performs processing of scanning in a vertical direction (column direction) for each one-field period to successively select the pixel sections 2PXL connected to the scanning lines 5-1 to 5-*m* in a unit of a row.

In particular, when a scanning pulse SP1 is applied from the vertical driving circuit 3 to the scanning line 5-1, then the pixels in the columns in the first row are selected, but when another scanning pulse SP2 is applied to the scanning line 5-2, the pixels in the columns in the second row are selected. Thereafter, scanning pulses SP3, . . . , SPm are successively applied to the scanning lines 5-3, . . . , 5-*m* in a similar manner, respectively.

The horizontal driving circuit 4 receives a horizontal start pulse HST produced by a clock generator not shown for triggering horizontal scanning and horizontal clocks HCK and HCKX of the opposite phases to each other for serving as a reference to horizontal scanning to produce a sampling pulse. Further, the horizontal driving circuit 4 successively samples image data R (red), G (green) and B (blue) inputted thereto in response to the sampling pulse produced thereby and supplies the sampled data as data signals to be written into the pixel sections 2PXL to the signal lines 6-1 to 6-*n*.

In the liquid crystal display apparatus 1 described above, the TFT 21 of the pixel sections 2PXL is formed from a transistor of a semiconductor thin film of amorphous silicon (a-Si) or polycrystalline silicon.

In the present embodiment, the liquid crystal display apparatus 1 having such a configuration as described above is formed as a liquid crystal display apparatus which is configured as an apparatus of the reflective and transmissive type and has a FFS (Fringe Field Switching) structure in order to assure a wide angular field of view.

Further, in the liquid crystal display apparatus 1 of the present embodiment, the effective pixel region section 2 has a particular structure described below in order that it can be driven by a single driving voltage for liquid crystal without employing a complicated driving method or driving circuit.

In the following, a particular structure of the liquid crystal display apparatus 1 is described.

<First Embodiment>

Figure 4:
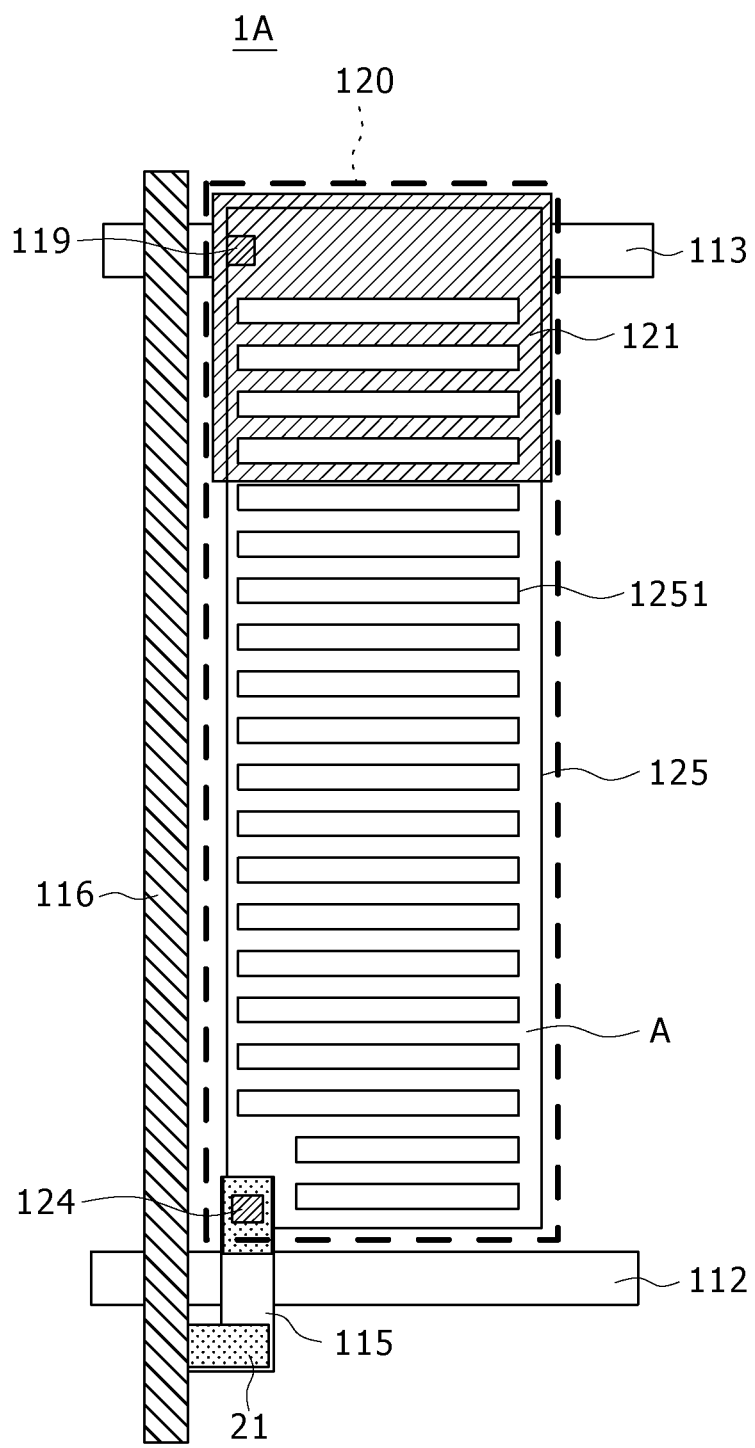
FIG. 4 is a schematic plan view showing a layout of a liquid crystal display apparatus of the reflective and transmissive type according to a first embodiment of the present invention.
Figure 5:
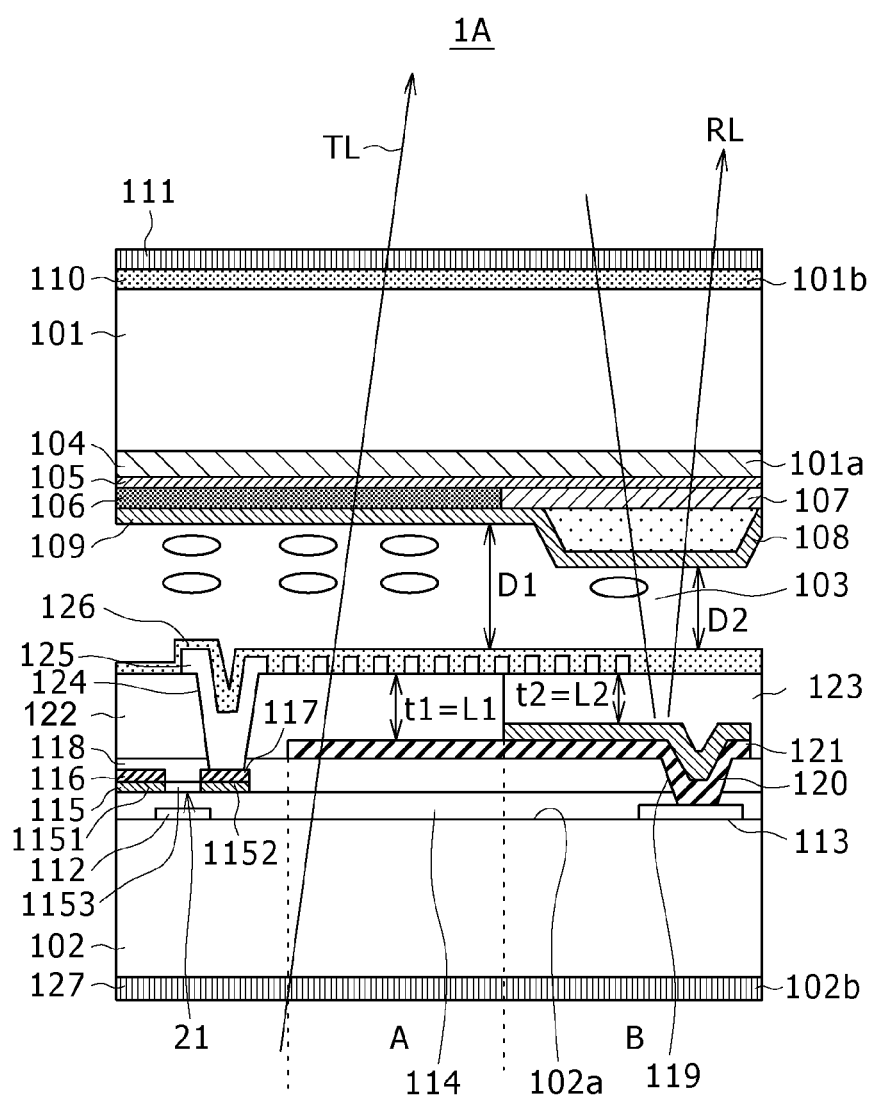
FIG. 5 is a cross sectional view of the liquid crystal display apparatus of the reflective and transmissive type of FIG. 4.

FIG. 4 shows a layout of a liquid crystal display apparatus of the reflective and transmissive type according to a first embodiment of the present invention, and FIG. 5 shows a cross section of the liquid crystal display apparatus of the reflective and transmissive type.

The liquid crystal display apparatus 1A according to the first embodiment includes a liquid crystal layer 103 including a plurality of liquid crystal molecules and disposed between a first transparent substrate (upper transparent substrate) 101 and a second transparent substrate (lower transparent substrate) 102. In other words, the liquid crystal layer 103 is held between and by the first transparent substrate 101 and the second transparent substrate 102.

The liquid crystal display apparatus 1A has a transmission region A and a reflection region B formed in parallel to each other. The thickness (first liquid crystal thickness: first substrate gap) of the liquid crystal layer 103 in the transmission region A is set to D1, and the thickness (second liquid crystal thickness: second substrate gap) of the liquid crystal layer 103 in the reflection region B is set to D2.

In the liquid crystal display apparatus 1A, the thicknesses D1 and D2 are set so as to satisfy a relationship D1>D2 as seen in FIG. 5.

The first transparent substrate 101 and the second transparent substrate 102 are formed from a transparent insulating substrate of, for example, glass.

The first transparent substrate 101 has a color filter 104 formed on a first face 101a thereof which opposes to the liquid crystal layer 103, and an orientation film 105 is formed on the color filter 104. A non-phase difference film 106 and a phase difference film 107 are formed in parallel to each other on the orientation film 105.

The non-phase difference film 106 is formed on the transmission region A, and the phase difference film 107 is formed on the reflection region B. The non-phase difference film 106 is formed by selective exposure which may be UV exposure after, for example, a phase difference film is formed (applied).

In the transmission region A, transmission light TL passes only once, and no phase difference adjustment is required. Therefore, the non-phase difference film 106 is disposed.

In contrast, in the reflection region B, incoming light passes once, whereafter reflected light RL of the incoming light passes and gives rise to a light path difference. As a result, there is the necessity to adjust the phase difference. Therefore, the phase difference film 107 is disposed.

Incidentally, the reflection region B must selectively implement circularly polarized light. Therefore, the reflection region B requires a phase difference plate for establishing a circular polarization mode.

However, it is difficult to selectively mount a phase difference plate in the form of a film for each pixel of the micron order on the outer side of the first transparent substrate 101 adjacent a light emerging side polarizing plate 111 if elongation and so forth of the film are taken into consideration.

Therefore, in the present embodiment, the phase difference film 107 is selectively formed in the liquid crystal cells to form the reflection region B as of the FFS type.

In order to achieve both of the transmission mode and the reflection mode in the FFS structure, it is reasonable to form the phase difference film 107 in the reflection region B while the transmission region A passes linearly polarized light.

In the present embodiment, the phase difference film 107 is formed on the first transparent substrate 101 to form an offset structure.

The built-in phase difference film 107 applies retardation (circular polarization) of a ½ wavelength to vertically polarized light in the transmission region A.

In addition, the retardation of the liquid crystal layer 103 in the reflection region B is a ¼ wavelength.

In the reflection region B of the liquid crystal display apparatus 1A, light comes in from the polarizing plate 111 on the upper face of the liquid crystal display apparatus 1A and is reflected by the reflecting film 121 in the liquid crystal panel. Thereafter, the light passes through the light emerging side polarizing plate 111 on the upper face of the apparatus gain. Consequently, the light can be recognized by an observer.

In the transmission region A of the liquid crystal display apparatus 1A, light comes in through a polarizing plate 127 on the lower face of the liquid crystal display apparatus 1A and then passes through the light emerging side polarizing plate 111 on the upper face of the liquid crystal display apparatus 1A so that it is recognized by the observer.

From the difference in light, the phases of the light which is to make dark display from a reflection region B and a transmission region A exhibit a phase difference of a ¼ wavelength. In order to make it possible to apply the same voltage in the reflection region B and the transmission region A, it is necessary to cancel the phase difference of a ¼ wavelength between the reflection region B and the transmission region A. To this end, a phase difference canceling portion (film) for shifting the wavelength of light through the reflection region B by a ¼ wavelength is required.

A flattening film 108 by which the gap D2 of the liquid crystal layer 103 in the reflection region B can be adjusted is formed on the phase difference film 107.

Further, a vertical orientation film (first orientation film) 109 is formed on the non-phase difference film 106, phase difference film 107 and flattening film 108.

Further, the light emerging side polarizing plate 111 is formed on a second face 101b on the light emerging side of the first transparent substrate 101 with a pressure sensitive adhesive 110 interposed therebetween.

On a first face 102a of the second transparent substrate 102 which opposes to the liquid crystal layer 103, a scanning wiring line 112 (corresponding to the scanning line (gate line) 5 of FIG. 1) which corresponds to the gate electrode of the TFT 21 is formed on the transmission region A side, and, for example, a VCOM common wiring line 113 (corresponding to the common wiring line 7 of FIG. 1) is formed on the reflection region B side.

It is to be noted that the scanning wiring line 112 may be formed by forming a film of a metal or an alloy, for example, of molybdenum (Mo) or tantalum (Ta).

An insulating film 114 which functions as a gate insulating film is formed in such a manner as to cover the scanning wiring line 112, VCOM common wiring line 113 and first face 102a of the second transparent substrate 102.

An n-type semiconductor layer 115 is formed in a region of the insulating film 114 opposing to the scanning wiring line (gate electrode) 112. The semiconductor (thin film) layer 115 includes a source electrode portion (S) 1151 and a drain electrode portion (D) 1152 each in the form of a+diffusion layer, and a channel formation region 1153.

The semiconductor thin film layer 115 is formed from a thin film of low temperature polycrystalline silicon obtained, for example, by a CVD method or the like.

A signal wiring line (corresponding to the signal line 6 of FIG. 1) 116 made of, for example, aluminum (Al) is formed on the source electrode portion (S) 1151. Meanwhile, a conducting portion (connection electrode) 117 made of, for example, aluminum in the layer same as that of the signal wiring line 116 is formed on the drain electrode portion (D) 1152.

The TFT 21 of FIG. 1 is formed from the scanning wiring line (gate electrode) 112, semiconductor thin film layer 115 and so forth. The TFT 21 has a bottom gate structure.

An interlayer insulating film 118 is formed on the semiconductor thin film layer 115, signal wiring line 116, conducting portion 117 and insulating film 114.

Further, a contact hole 119 is formed in the insulating film 114 and the interlayer insulating film 118 on the VCOM common wiring line 113 such that it extends to the VCOM common wiring line 113.

A transparent counter electrode 120 made of, for example, ITO is formed on the interlayer insulating film 118 in the transmission region A and the reflection region B, in the contact hole 119 and on the VCOM common wiring line 113 in the contact hole 119.

Furthermore, the reflecting film 121 of metal having a high reflection factor is formed on the counter electrode 120 in the reflection region B. A transparent region side interlayer insulating film (first interlayer insulating film) 122 is formed on the interlayer insulating film 118 and the counter electrode 120 in the TFT regions and the transmission region A, and a reflection region side interlayer insulating film (second interlayer insulating film) 123 is formed on the reflecting film 121 in the reflection region B.

While the first interlayer insulating film 122 and the second interlayer insulating film 123 are formed parallelly in this manner, the thickness L1 of the first interlayer insulating film 122 and the thickness L2 of the second interlayer insulating film 123 in the transmission region A are different from each other. Here, the thickness L1 and the thickness L2 have a relationship of L1(t1)>L2(t2).

A contact hole 124 is formed in the interlayer insulating film 118 and the first interlayer insulating film 122 above the conducting portion 117 formed on the drain electrode portion 1152 of the semiconductor thin film layer 115 such that it extends to the conducting portion 117.

A transparent pixel electrode 125 made of, for example, ITO is formed on the first interlayer insulating film 122 and the second interlayer insulating film 123, in the contact hole 124 and on the conducting portion 117 in the contact hole 124.

Pixel electrode blanked portions 1251 each in the form of a slit are formed as a fringe pattern on the pixel electrode 125 as seen in FIGS. 4 and 5.

A horizontal orientation film 126 having a predetermined rubbing axis is formed on the first interlayer insulating film 122, second interlayer insulating film 123 and pixel electrode 125.

Further, the polarizing plate 127 is formed on a second face 102b side of the second transparent substrate 102.

In the FFS structure of the liquid crystal display apparatus 1A having the configuration described above, electric lines of force generated by the first interlayer insulating film 122 sandwiched by the pixel electrode 125 and the counter electrode 120 in the transmission region A and the second interlayer insulating film 123 sandwiched by the contact hole 124 and the counter electrode 120 in the reflection region B rely upon the film thickness.

As represented by the expression (1), L represents also electric lines of force (electric field strength), and the liquid crystal thickness (D: inter-substrate gap) is designed in order to control the electric lines of force:

$$Vlcd = n \cdot L/D\sqrt{(K/\in lcd)} \qquad (1)$$

where Vlcd is the driving voltage for the liquid crystal, L the interlayer insulating film thickness or line distance, D the liquid crystal thickness (gap), K the viscosity constant of the liquid crystal, and $\in lcd$ the relative dielectric constant of the liquid crystal.

If the electric lines of force are intense, then the gap is designed so as to be comparatively great, but if the electric lines of force are weak, then the gap is described so as to be comparatively small.

In such a multi-gap configuration as shown in FIG. 5, since the gap is decided relatively between the transmission region A and the reflection region B, it is necessary to make contrivance so as to adjust the driving voltage using the second transparent substrate 102 (TFT substrate).

In the present first embodiment, the film thickness L1(t1) of the first interlayer insulating film 122 is set to twice or more the thickness L2(t2) of the second interlayer insulating film 123 so that the gap decreased by the reflection region B, that is, ½, is cancelled so that the driving voltages for the transmission region A and the reflection region B may be equal to each other.

It is to be noted that, in the present first embodiment, the first interlayer insulating film 122 and the second interlayer insulating film 123 have an equal relative dielectric constant.

FIG. 6 illustrates a table of liquid crystal driving voltages and parameters used in the present embodiment.

Figure 7:
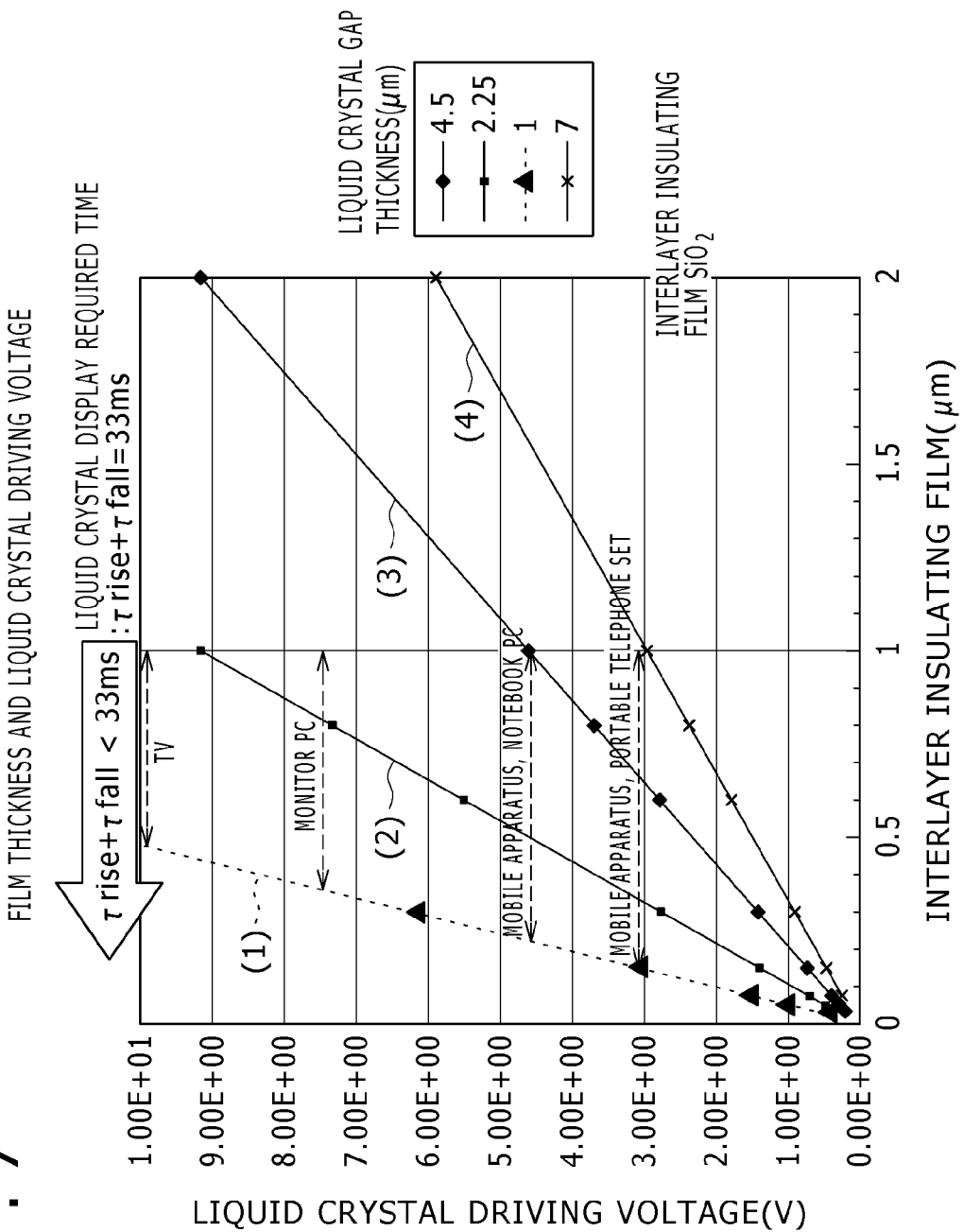
FIG. 7 is a diagram illustrating a relationship between an interlayer insulating film and the liquid crystal driving voltage in the liquid crystal display apparatus of FIG. 4.

FIG. 7 illustrates a relationship between the interlayer insulation film and the liquid crystal driving voltage in the present embodiment. In FIG. 7, the axis of abscissa indicates the interlayer insulating film L, and the axis of abscissa indicates the liquid crystal driving voltage.

Referring to FIG. 7, a straight line denoted by <1> illustrates a relationship between the interlayer insulating film and the liquid crystal driving voltage where the liquid crystal cell gap (liquid crystal thickness) D is 1 μm. Another straight line denoted by <2> illustrates a relationship between the interlayer insulating film and the liquid crystal driving voltage where the liquid crystal cell gap (liquid crystal thickness) D is 2.25 μm. A further straight line denoted by <3> illustrates a relationship between the interlayer insulating film and the liquid crystal driving voltage where the liquid crystal cell gap (liquid crystal thickness) D is 4.5 μm. A still further straight line denoted by <4> illustrates a relationship between the interlayer insulating film and the liquid crystal driving voltage where the liquid crystal cell gap (liquid crystal thickness) D is 7 μm.

Here, the film thickness of the interlayer insulating film is indicated by L of the expression (1).

It can be recognized from this that, in order to establish liquid crystal display, liquid crystal display required time: τrise+τfall≦33 ms is required. Besides, it is known that, in order to assure the accuracy in fabrication of the liquid crystal cell gap (liquid crystal thickness) from a small to a large liquid crystal cell size, the necessary liquid crystal cell gap D is 1 μm or more.

This gives rise to a limitation (restriction) with regard to the interlayer insulating film L between the thickness L1 and the thickness L2 as seen in FIG. 7.

In the present embodiment, in order to make the driving voltages for the reflection region B and the transmission region A equal to each other, it is necessary to satisfy the relationship of L2 (reflection region)<L1 (transmission region).

Further, where a mobile apparatus, a portable telephone set and so forth are taken into consideration, from FIG. 7, the interlayer insulating film is preferably equal to or greater than 0.15 μm.

In particular, the condition in applications (driving voltage 3 V) to a mobile apparatus and a portable telephone set is ⅐(0.15)<L2/L1<1. In this instance, the interlayer insulating film thickness is not less than 0.15 μm but not more than 1 μm.

The condition in an application (driving voltage 4.5 V) to a mobile apparatus or a notebook PC is ⅕<L2/L1<1. In this instance, the interlayer insulating film thickness is not less than 0.2 μm but not more than 1 μm.

The condition in an application (driving voltage 7.5 V) to a monitor PC is $1/3 < L2/L1 < 1$. In this instance, the interlayer insulating film thickness is not less than 0.35 μm but not more than 1 μm.

The condition in an application to a television set is $1/2 < L2/L1 < 1$. In this instance, the interlayer insulating film thickness is more than 0.5 μm but less than 1 μm.

Here, since $L1=t1$ and $L2=t2$, in order to satisfy the minimum condition described above, it is necessary for the film thickness t1 of the first interlayer insulating film 122 between the pixel electrode 125 and the counter electrode 120 in the transmission region A and the film thickness t2 of the second interlayer insulating film 123 between the pixel electrode 125 and the counter electrode 120 in the reflection region B to satisfy $t1 > t2 > 1/3 \times t1$ or, from the optical condition, $t \leq 1/2 \times t1$.

It is to be noted that the film thickness t2 may be displaced a little from the condition $t2 = 1/2 \times t1$ or may not satisfy the condition $t2 = 1/2 \times t1$ in the optimization of the polarizer, contrast and angular field of view.

The liquid crystal display apparatus 1A having such a structure as described above has both of transmission and reflection functions of the FFS type.

Further, since a single driving voltage can be used for both of transmission and reflection, the number of power supply voltages can be reduced and a level shifter circuit in the driving circuit can be configured in a simple circuit configuration.

Further, a complicated pixel layout in transmission and reflection regions of the pixel section can be simplified. Therefore, a pixel layout of a high transmission factor and a high reflection factor can be achieved.

Further, since the driving circuits are handled with a simple power supply, the number of driving circuits can be reduced and the liquid crystal display apparatus can be fabricated at a reduced cost.

<Second Embodiment>

Figure 8:
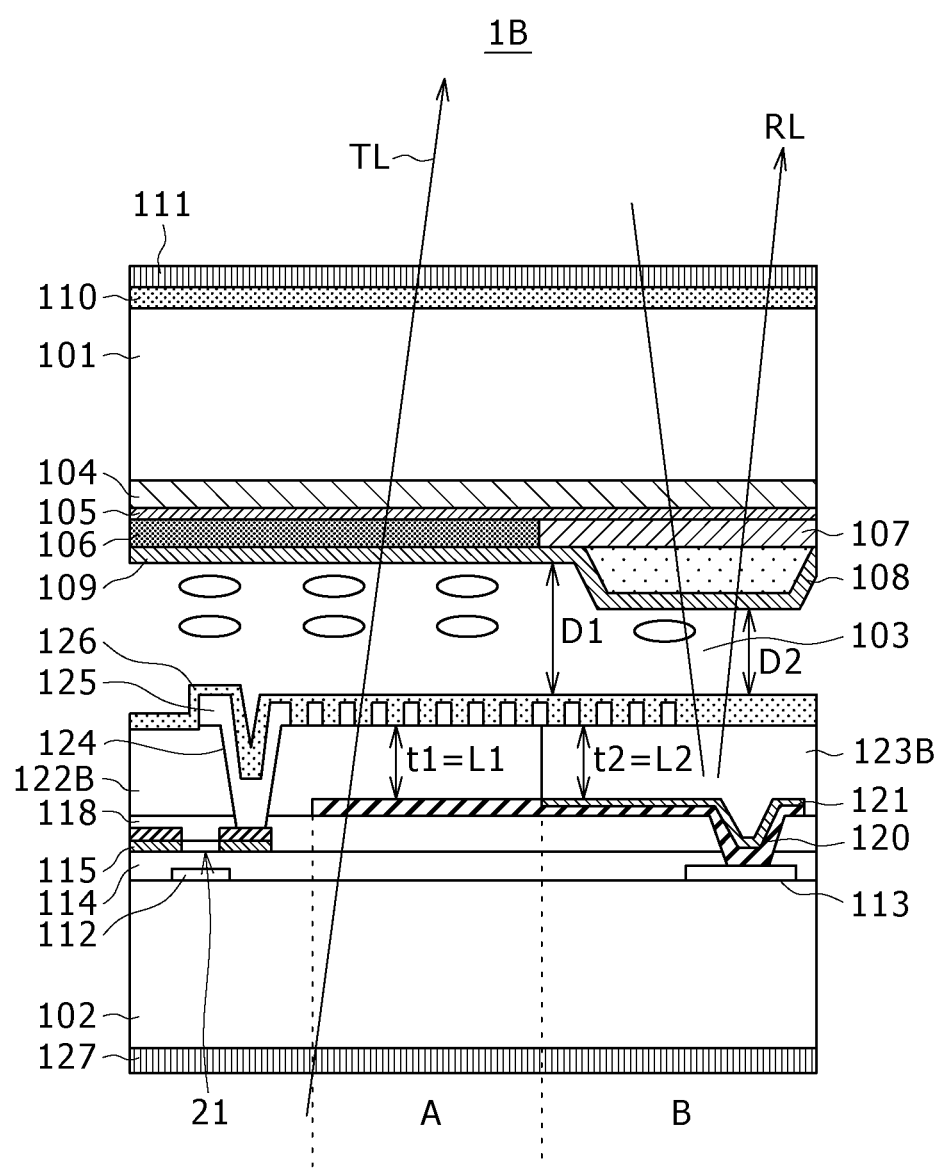
FIGS. 8, 9, 10, 11 and 12 are cross sectional views showing liquid crystal display apparatus of the reflective and transmissive type according to second to sixth embodiments of the present invention, respectively.

FIG. 8 shows a liquid crystal display apparatus of the reflective and transmissive type according to a second embodiment of the present invention.

Referring to FIG. 8, the liquid crystal display apparatus 1B of the second embodiment is a modification to the liquid crystal display apparatus 1A of the first embodiment but is different in the following points. In particular, the liquid crystal display apparatus 1B of the second embodiment is different in that the film thickness t1 of the first interlayer insulating film 122B between the pixel electrode 125 and the counter electrode 120 in the transmission region A and the film thickness t2 of the second interlayer insulating film 123B between the pixel electrode 125 and the counter electrode 120 in the reflection region B are set equal to each other so that the first interlayer insulating film 122B and the second interlayer insulating film 123B may have different relative dielectric constants from each other.

Since, in such a multi-gap structure as shown in FIG. 8, the gap is determined relatively depending upon the transmission region A and the reflection region B, it is necessary to contrive the second transparent substrate 102 (TFT substrate) to adjust the driving voltages.

In the present second embodiment, the relative dielectric constant $\in 1$ of the first interlayer insulating film 122B is set to equal to or less than one half with respect to the relative dielectric constant $\in 2$ of the second interlayer insulating film 123B so that the gap reduced to one half in the reflection region is canceled to make the driving voltages for the transmission region A and the reflection region B equal to each other.

This has an effect of strengthening the electric field intensity in the reflection region B so as to actually reduce the constant of L in the expression (1) to one half. It is to be noted that, as described hereinabove, the first interlayer insulating film 122B and the second interlayer insulating film 123B have an equal film thickness.

Incidentally, as regards the relative dielectric constant of the insulating films of the semiconductors, where the relative dielectric constant $\in 1$ is $\in\_SiO_2 = 3.9$ and the other relative dielectric constant are $\in 2$, since $\in\_Si_3N_4 = 7.5$ and $\in\_Ta_2O_2 = 22$ are involved, it is necessary to satisfy $\in 1 < \in 2 < 6 \times \in 1$ or $\in 2 \geq 2 \times \in 1$.

It is to be noted that the relative dielectric constant $\in 1$ may be displaced a little from $\in 2 = 2 \times \in 1$ or may not satisfy the condition $\in 2 = 2 \times \in 1$ in the optimization of the polarizer, contrast and angular field of view.

It is to be noted that the interlayer insulating films 122B and 123B can be formed from an organic film of acrylic polyimide or the like.

The liquid crystal display apparatus 1B according to the present second embodiment has both of transmission and reflection functions of the FFS type and the IPS type similarly to the liquid crystal display apparatus 1A of the first embodiment described hereinabove.

Further, since a single driving voltage can be used for both of transmission and reflection, the number of power supply voltages can be reduced and a level shifter circuit in the driving circuit can be configured in a simple circuit configuration.

Further, a complicated pixel layout in transmission and reflection regions of the pixel section can be simplified. Therefore, a pixel layout of a high transmission factor and a high reflection factor can be achieved.

Further, since the driving circuits are handled with a simple power supply, the number of driving circuits can be reduced and the liquid crystal display apparatus can be fabricated at a reduced cost.

<Third Embodiment>

Figure 9:
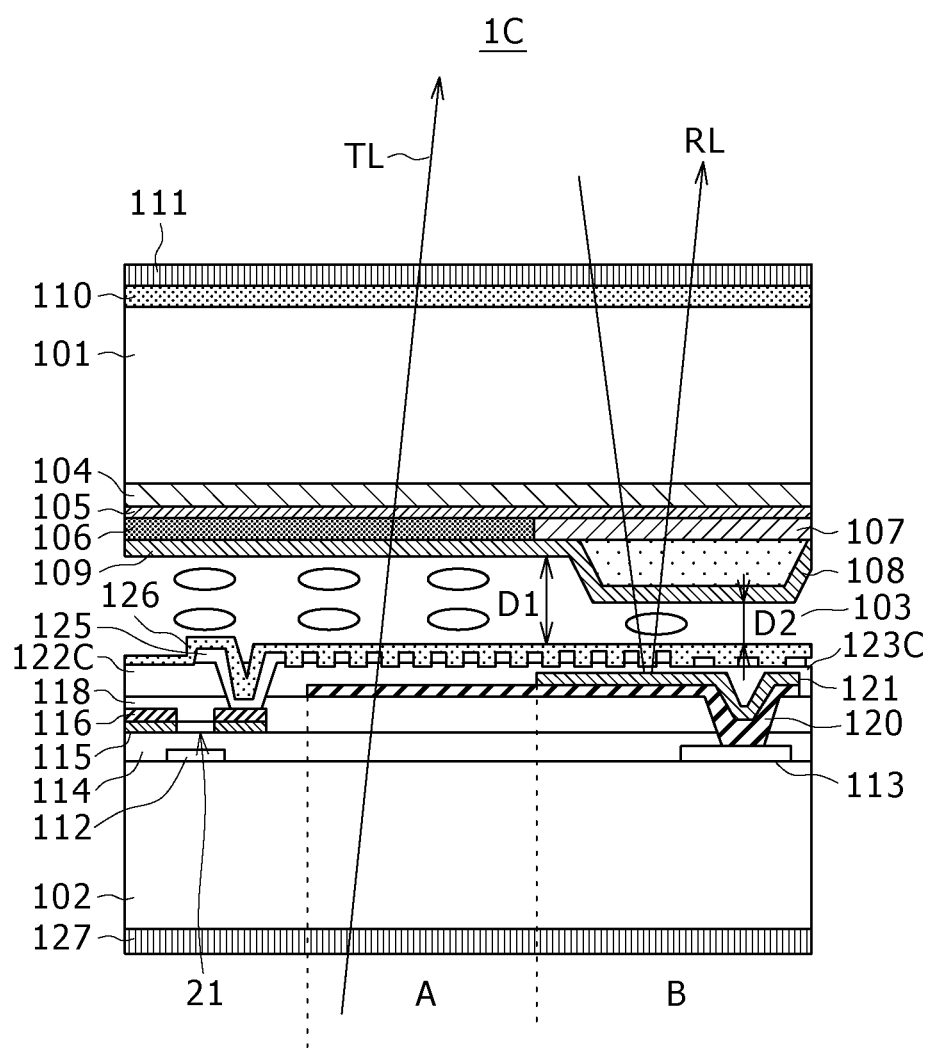

FIG. 9 shows a liquid crystal display apparatus of the reflective and transmissive type according to a third embodiment of the present invention.

Referring to FIG. 9, the liquid crystal display apparatus 1C of the third embodiment is a modification to the liquid crystal display apparatus 1B of the second embodiment but is different in the following points. In particular, the liquid crystal display apparatus 1C of the third embodiment is different in that the liquid crystal layer thickness (gap thickness) D1 in the transmission region A is set to equal or more than twice the liquid crystal layer thickness (gap thickness) D2 in the reflection region B. Also in this instance, the phase difference film 107 in the liquid crystal cells disposed in the reflection region B are located on the first transparent substrate 101 side.

Incidentally, the reflection region B must selectively implement circularly polarized light. Therefore, the reflection region B requires a phase difference plate for establishing a circular polarization mode.

However, it is difficult to selectively mount a phase difference plate in the form of a film for each pixel of the micron order on the outer side of the first transparent substrate 101 adjacent the light emerging side polarizing plate 111 if elongation and so forth of the film are taken into consideration.

Therefore, in the present embodiment, the phase difference film 107 is selectively formed in the liquid crystal cells to form the reflection region B as of the FFS type.

In order to achieve both of the transmission mode and the reflection mode in the FFS structure, it is reasonable to form the phase difference film 107 in the reflection region B while the transmission region A passes linearly polarized light.

In the present embodiment, the phase difference film 107 is formed on the first transparent substrate 101 to form an offset structure.

The built-in phase difference film 107 applies retardation (circular polarization) of a ½ wavelength to vertically polarized light in the transmission region A.

In addition, the retardation of the liquid crystal layer 103 in the reflection region B is a ¼ wavelength.

In the reflection region B of the liquid crystal display apparatus 1C, light comes in from the polarizing plate 111 on the upper face of the liquid crystal display apparatus 1C and is reflected by the reflecting film 121 in the liquid crystal panel. Thereafter, the light passes through the polarizing plate 111 on the upper face of the apparatus gain. Consequently, the light can be recognized by an observer.

In the transmission region A, light comes in through the polarizing plate 127 on the lower face of the liquid crystal display apparatus 1C and then passes through the polarizing plate 111 on the upper face of the liquid crystal display apparatus 1C so that it is recognized by the observer.

From the difference in light, the phases of the light which is to make dark display from a reflection region B and a transmission region A exhibit a phase difference of a ¼ wavelength. In order to make it possible to apply the same voltage in the reflection region B and the transmission region A, it is necessary to cancel the phase difference of a ¼ wavelength between the reflection region B and the transmission region A. To this end, a phase difference canceling portion (film) for shifting the wavelength of light through the reflection region B by a ¼ wavelength is required.

According to the present third embodiment, similar effects to those of the first and second embodiments described hereinabove can be achieved.

<Fourth Embodiment>

Figure 10:
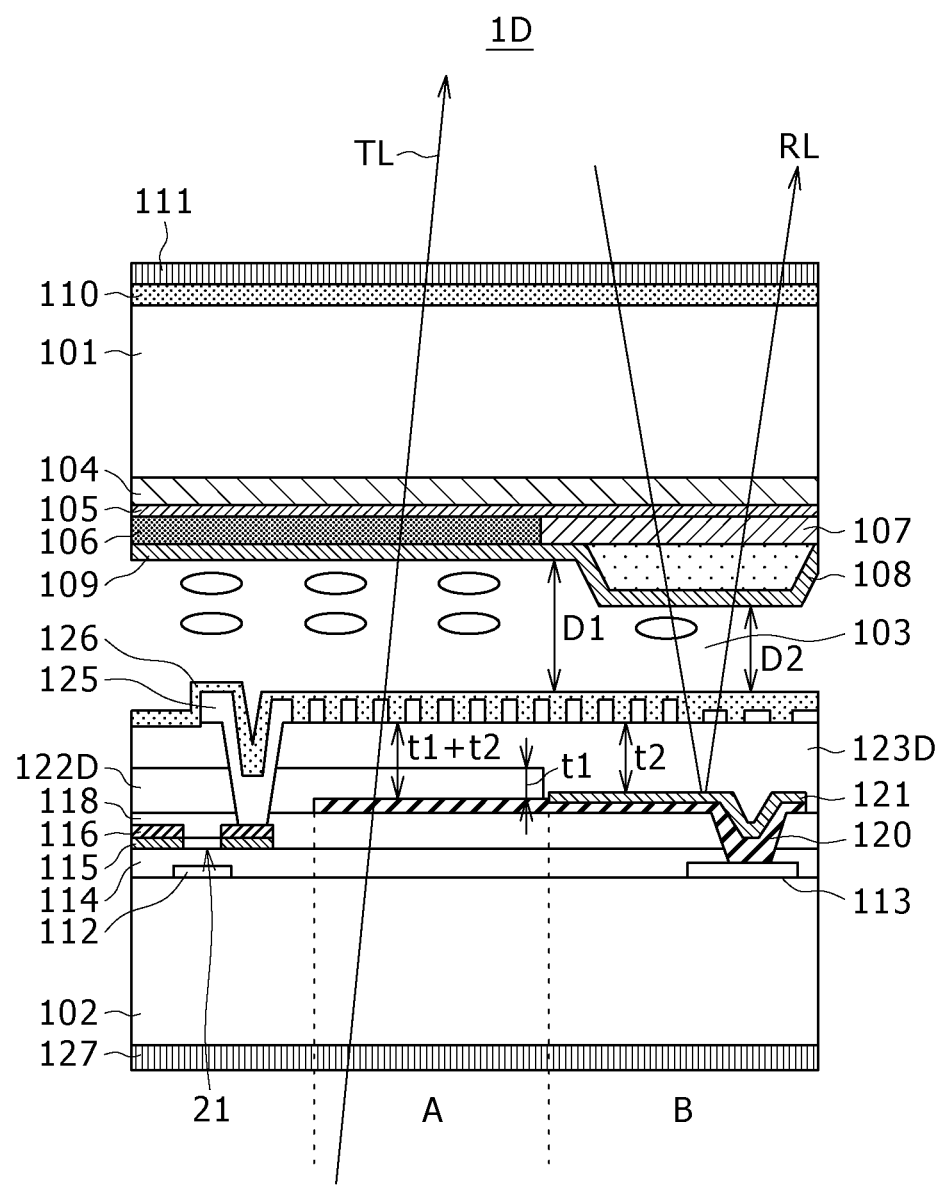

FIG. 10 shows a liquid crystal display apparatus of the reflective and transmissive type according to a fourth embodiment of the present invention.

Referring to FIG. 10, the liquid crystal display apparatus 1D of the fourth embodiment is a modification to the liquid crystal display apparatus 1B of the second embodiment but is different in the following points. In particular, the liquid crystal display apparatus 1D of the fourth embodiment is different in that the first interlayer insulating film 122D in the transmission region A is formed so as to be covered with the second interlayer insulating film 123D in the reflection region B and the relative dielectric constant $\in 1$ in the transmission region A and the relative dielectric constant $\in 2$ are made different from each other so as to satisfy $\in 1 < \in 2 < 6 \times \in 1$ or $\in 2 < 2 \times \in 1$ In this instance, the thickness of the interlayer insulating film in the transmission region A is t1+t2, and the thickness of the interlayer insulating film in the reflection region B is t2. Consequently, the relationship of t1+t2>t2 is satisfied.

According to the present fourth embodiment, similar advantages to those of the second embodiment described hereinabove are achieved.

<Fifth Embodiment>

Figure 11:
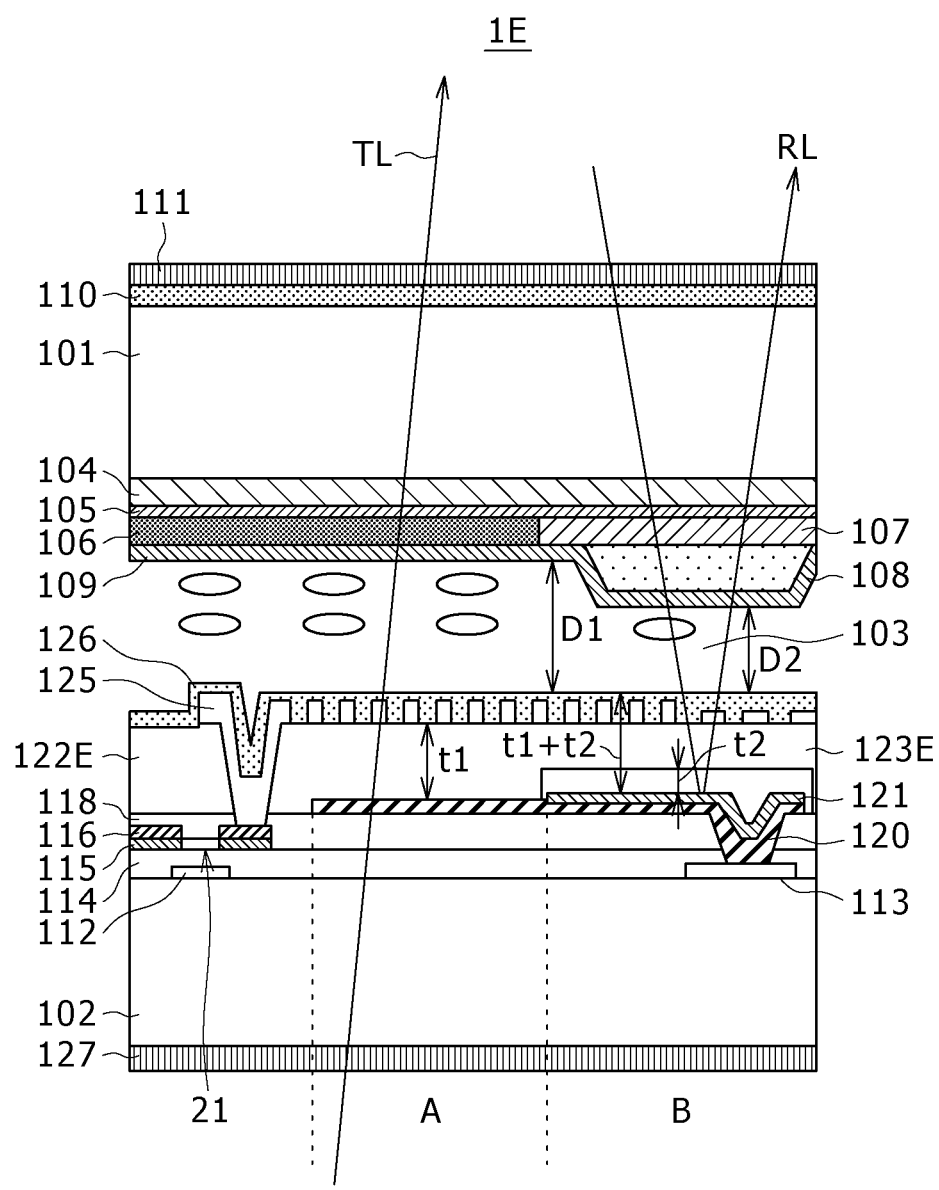

FIG. 11 shows a liquid crystal display apparatus of the reflective and transmissive type according to a fifth embodiment of the present invention.

Referring to FIG. 11, the liquid crystal display apparatus 1E of the fifth embodiment is a modification to the liquid crystal display apparatus 1B of the second embodiment but is different in the following points. In particular, the liquid crystal display apparatus 1E of the fifth embodiment is different in that the first interlayer insulating film 122E in the transmission region A is formed so as to cover the second interlayer insulating film 123E in the reflection region B and the relative dielectric constant $\in 1$ in the transmission region A and the relative dielectric constant $\in 2$ in the reflection region B are made different from each other so as to satisfy the requirement of $\in 1 < \in 2 < 6 \times \in 1$ or $\in 2 \leq 2 \times \in 1$.

In this instance, the thickness of the interlayer insulating film in the transmission region A is t1 and the thickness of the interlayer insulating film in the reflection region B is t1+t2. Therefore, the relationship of t1<t1+t2 is satisfied.

According to the present fifth embodiment, similar advantages to those of the second embodiment described hereinabove are achieved.

<Sixth Embodiment>

Figure 12:
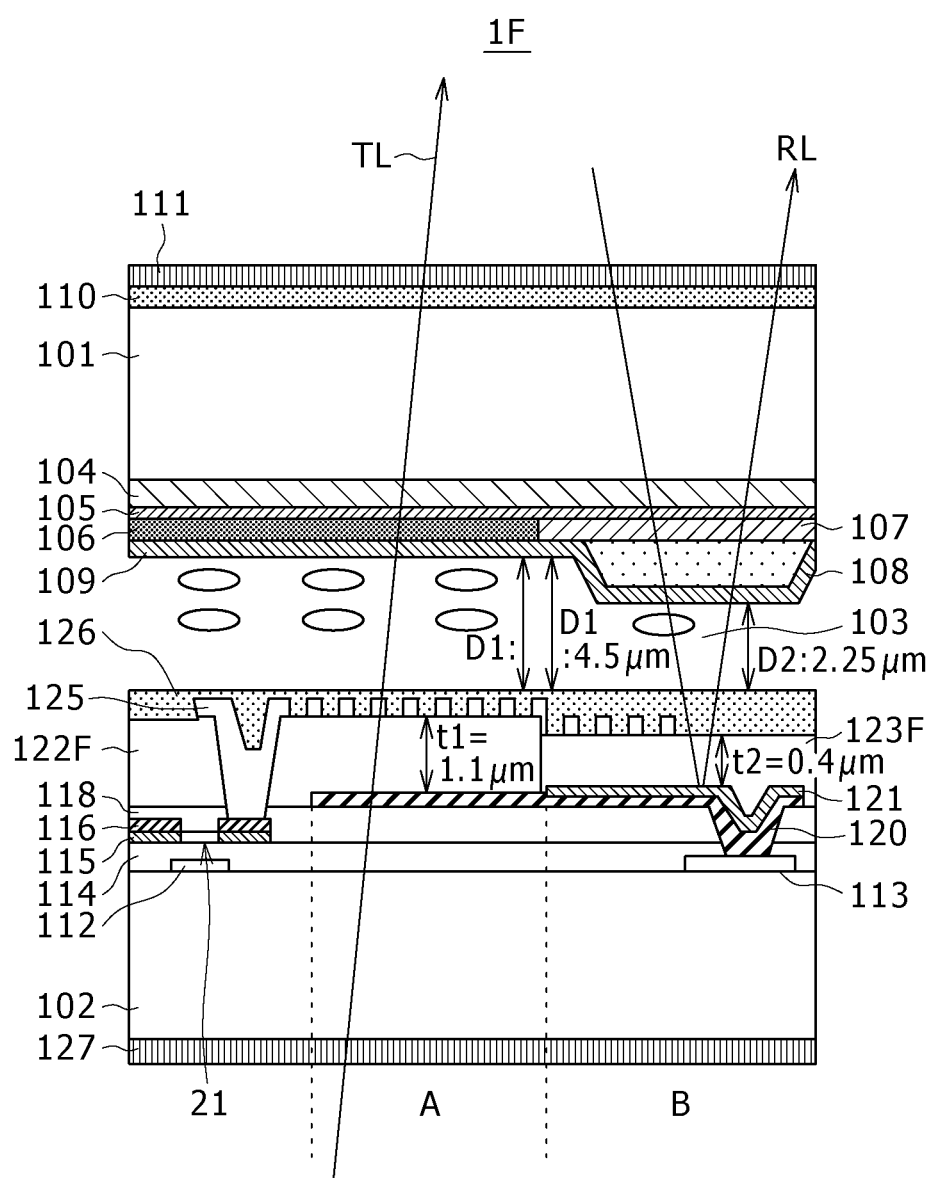

FIG. 12 shows a liquid crystal display apparatus of the reflective and transmissive type according to a sixth embodiment of the present invention.

Referring to FIG. 12, the liquid crystal display apparatus 1F of the sixth embodiment is a modification to the liquid crystal display apparatus 1B of the second embodiment but is different in the following points. In particular, the liquid crystal display apparatus 1F of the sixth embodiment is different in that the relative dielectric constant $\in 1$ of the first interlayer insulating film 122F is different from the relative dielectric constant $\in 2$ of the second interlayer insulating film 123F and besides the first interlayer insulating film 122F and the second interlayer insulating film 123F have different film thicknesses from each other.

In the present embodiment, in order to make the driving voltages on the transmission region A side and the reflection region B side equal to each other while the first interlayer insulating film 122F in the transmission region A and the second interlayer insulating film 123F in the reflection region B do not have an equal film thickness, the interlayer insulating film in the transmission region A and the reflection region B have different relative dielectric constants from each other.

In particular, in the liquid crystal display apparatus 1F, the first interlayer insulating film 122F in the transmission region A and the second interlayer insulating film 123F in the reflection region B which have different relative dielectric constants from each other are formed (t1>t2). Thus, in order to make the driving voltage in the transmission region A and the driving voltage in the reflection region B equal to each other, the relative dielectric constant $\in 1$ of the first interlayer insulating film 122F in the transmission region A and the relative dielectric constant $\in 2$ of the second interlayer insulating film 123F in the reflection region B are made different from each other.

For example, as seen in FIG. 13, the first interlayer insulating film 122F is made of SiN and has a relative dielectric constant of 7.5 while the second interlayer insulating film 123F is made of $SiO_2$ and has another relative dielectric constant of 3.9.

Besides, the film thickness of the first interlayer insulating film 122F is 1 μm, and the film thickness of the second interlayer insulating film 123F is 0.7 μm.

Consequently, the driving voltage in the transmission region A having the first interlayer insulating film 122F is 3.34 V while the driving voltage in the reflection region B having the second interlayer insulating film 123F is 3.24 V. Consequently, the driving voltages for transmission and reception can be made substantially equal to each other.

<Seventh Embodiment>

Figure 14:
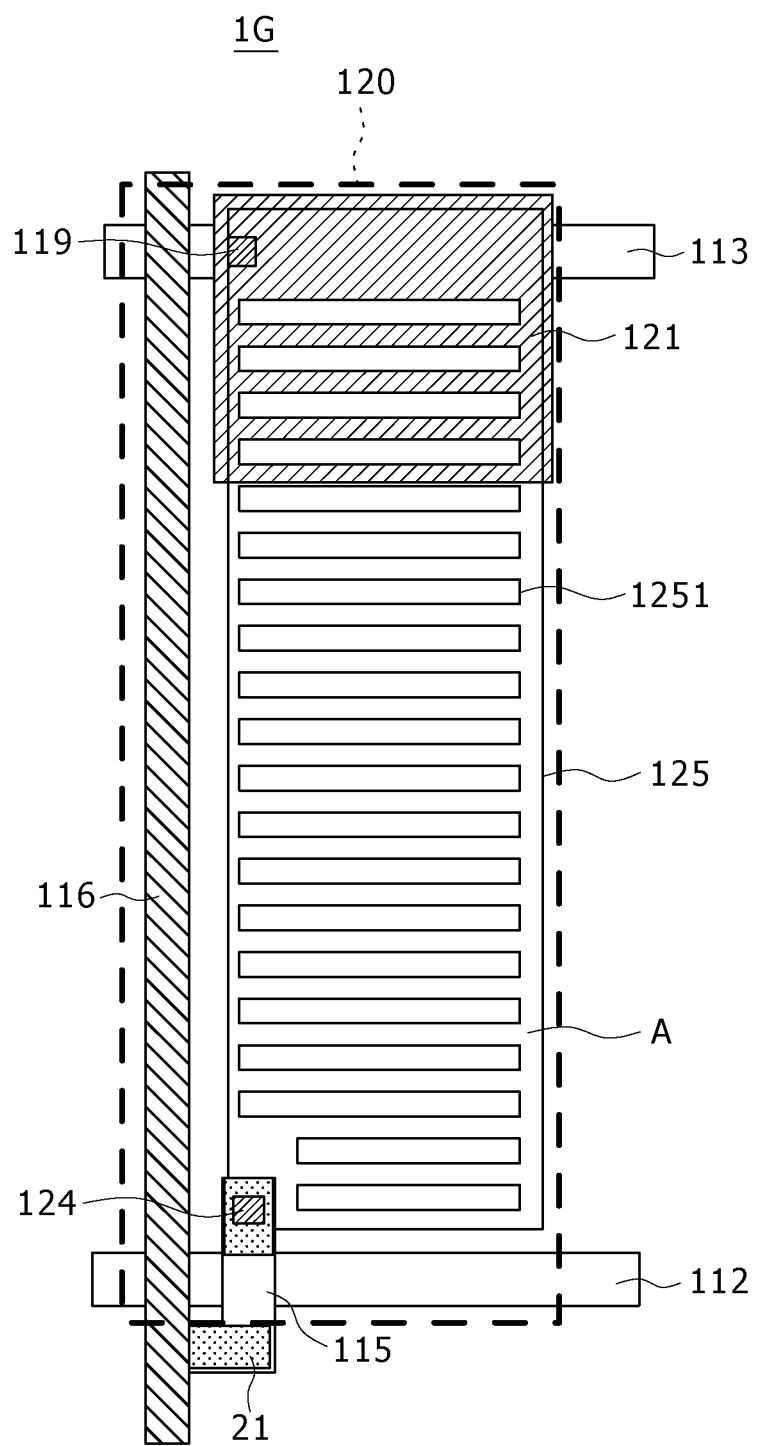
FIG. 14 is a plan view showing a layout of a liquid crystal display apparatus of the reflective and transmissive type according to a seventh embodiment of the present invention.
Figure 15:
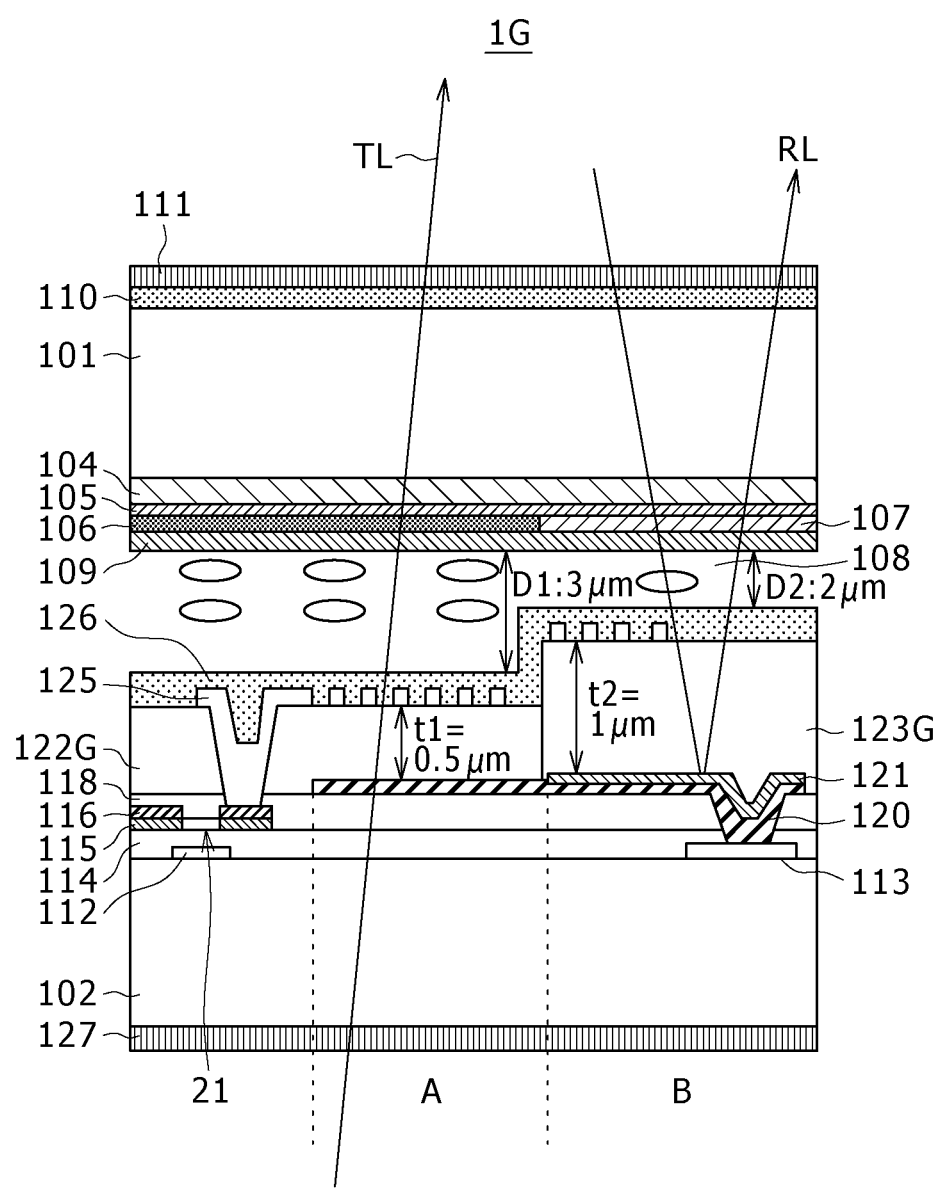
FIG. 15 is a cross sectional view of the liquid crystal display apparatus of the reflective and transmissive type of FIG. 14.

FIGS. 14 and 15 show a liquid crystal display apparatus of the reflective and transmissive type according to a seventh embodiment of the present invention.

Referring to FIGS. 14 and 15, the liquid crystal display apparatus 1G of the seventh embodiment is a modification to the liquid crystal display apparatus 1F of the sixth embodiment but is different in the following points. In particular, the liquid crystal display apparatus 1G of the seventh embodiment is different in that the film thickness t2 of the second interlayer insulating film 123G is set greater than the film thickness t1 of the first interlayer insulating film 122G to form the gap D2 in the reflection region B.

In this instance, the flattening film on the first transparent substrate 101 side is unnecessary.

In the present seventh embodiment, the film thickness t2 of the second interlayer insulating film 123G in the reflection region B is set greater than the film thickness t1 of the first interlayer insulating film 122G in the transmission region A and besides the effective pixel region section 2 in the reflection region B is used so as to serve also as an offset portion for the multi-gaps in the reflection region B.

In particular, in the present seventh embodiment, in order to make the driving voltages on the transmission region A side and the reflection region B side equal to each other while the first interlayer insulating film 122G in the transmission region A and the second interlayer insulating film 123G in the reflection region B do not have an equal film thickness, the relative dielectric constant ∈1 of the first interlayer insulating film 122G in the transmission region A is made different from the relative dielectric constant ∈2 of the second interlayer insulating film 123G in the reflection region B.

Besides, the effective pixel region section 2 is formed as an offset portion for obtaining multi-gaps in the reflection region B.

For example, as seen in FIG. 16, the first interlayer insulating film 122G is made of $SiO_2$ and has a relative dielectric constant of 3.9 while the second interlayer insulating film 123G is made of $TaO_2$ and has another relative dielectric constant of 22.

Besides, the first interlayer insulating film 122G is 0.5 μm, and the second interlayer insulating film 123G is 1 μm.

Consequently, the driving voltage in the transmission region A having the first interlayer insulating film 122G becomes 3.49 V, and the driving voltage in the reflection region B having the second interlayer insulating film 123G becomes 4.39. Consequently, the driving voltages for transmission and reflection can be made substantially equal to each other.

Besides, the liquid crystal layer thickness (substrate gap) D1 in the transmission region A can be set to 3 μm, and the gap (substrate gap) D2 in the reflection region B can be set to 2 μm. Consequently, an offset portion can be formed from the interlayer insulating film in the reflection region B.

It is to be noted that the present invention can be applied also where the material of the second interlayer insulating film 123G in the reflection region B is SIN.

Further, according to the liquid crystal display apparatus 1G of the seventh embodiment, the counter electrode overhangs (has an overlapping relationship with) the signal line and the gate line in transmissive and reflective type liquid crystal display as seen in FIG. 14.

In the present seventh embodiment, since the counter electrode 120 made of ITO or the like is disposed immediately above the signal wiring line 116 and the scanning wiring line (gate line) 112, jumping of a voltage variation from the signal wiring line 116 and the scanning wiring line (gate line) 112 into the counter electrode 120 can be prevented. Consequently, the variation at the signal wiring line 116 to the pixel electrode 125 disposed above the counter electrode 120 and the pixel electrode (ITO) 125 from the scanning wiring line (gate line) 112 by jumping in of the voltage variation can be suppressed. As a result, deterioration of the picture quality by flickering by horizontal and vertical crosstalk which appears in the liquid crystal display apparatus can be prevented.

<Eighth Embodiment>

Figure 17:
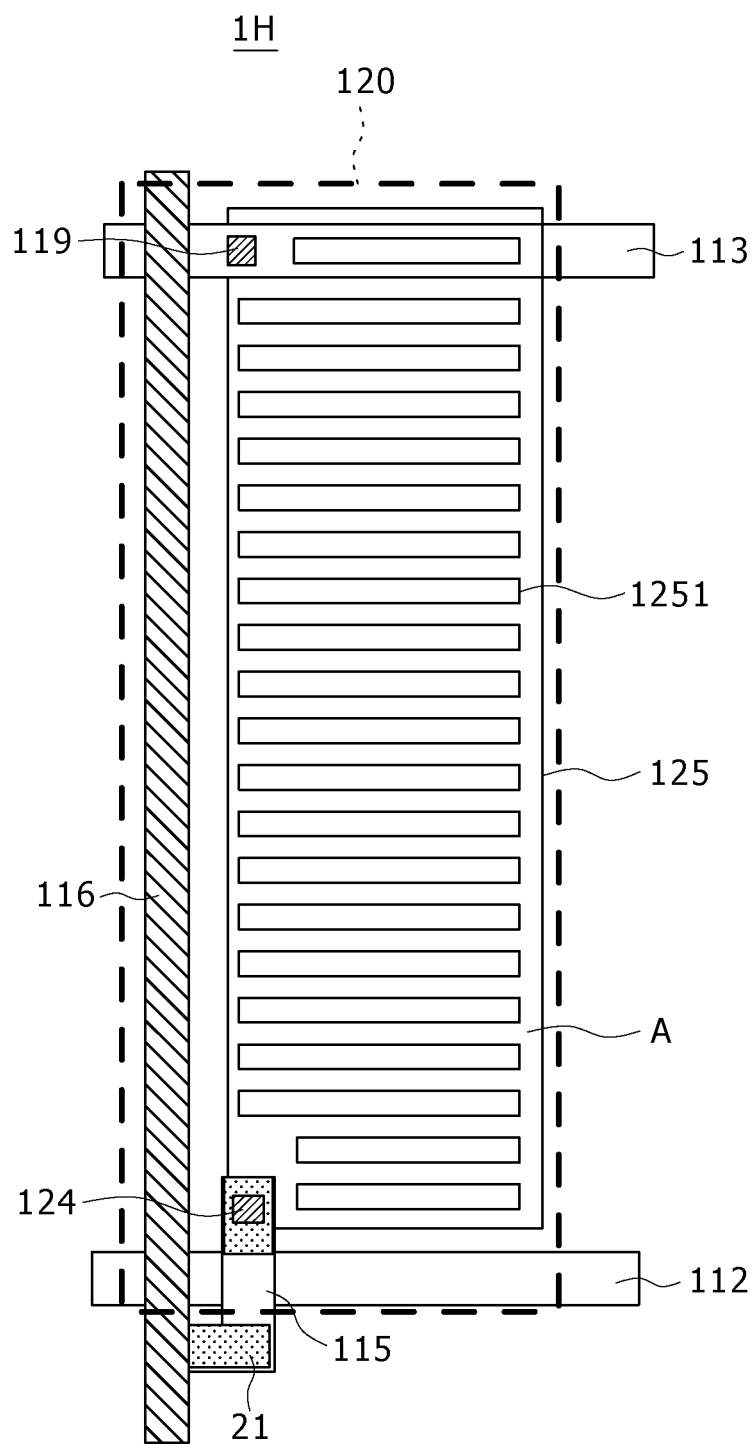
FIG. 17 is a plan view showing a layout of a liquid crystal display apparatus of the reflective and transmissive type according to an eighth embodiment of the present invention.
Figure 18:
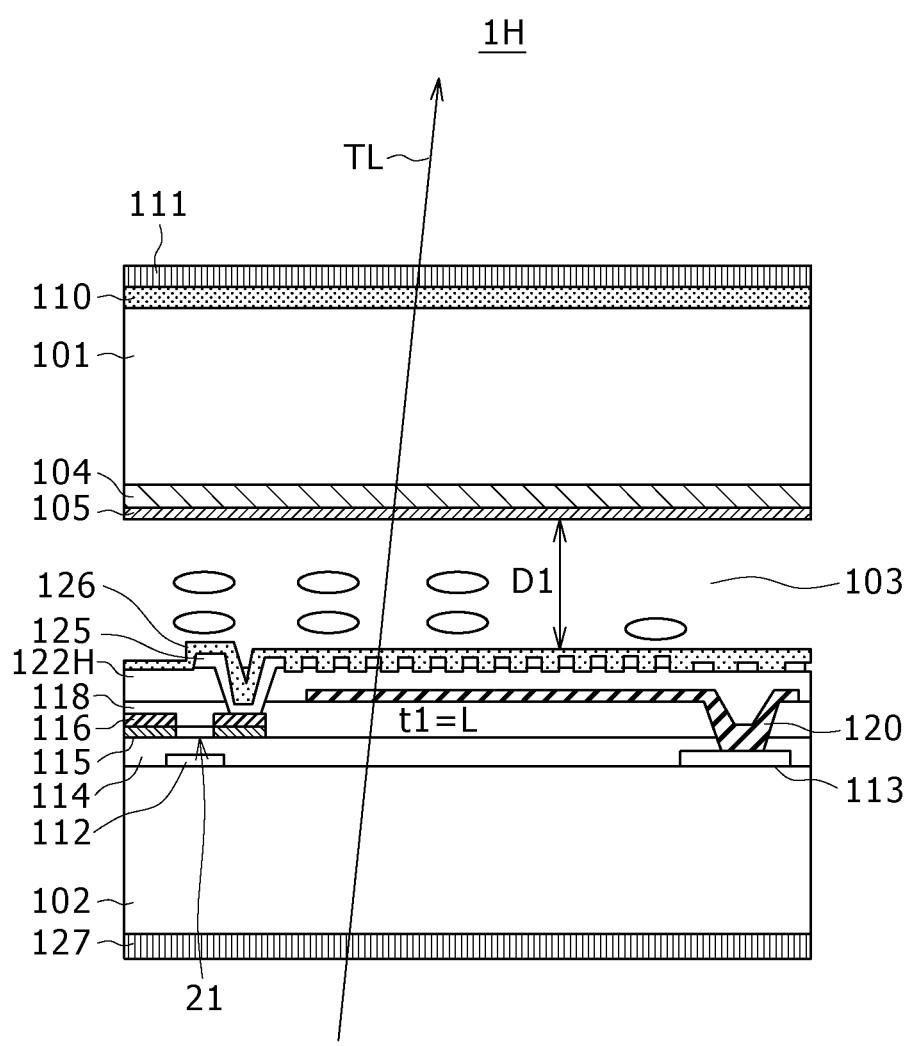
FIG. 18 is a cross sectional view of the liquid crystal display apparatus of the reflective and transmissive type of FIG. 17.

FIGS. 17 and 18 show a liquid crystal display apparatus of the reflective and transmissive type according to an eighth embodiment of the present invention.

The liquid crystal display apparatus 1H of the eighth embodiment is characterized in that, in transmission liquid crystal display and transmission and reflection liquid crystal display, a counter electrode overhangs (has an overlapping relationship with) a signal line and a gate line.

Referring to FIG. 17, the liquid crystal display apparatus 1H of the eighth embodiment is a modification to the liquid crystal display apparatus 1A of the first embodiment but is different in the following points. In particular, on the first transparent substrate 101 side, an orientation film 105 is formed on the color filter 104.

On the other hand, on the second transparent substrate 102, the reflecting film 121 is not formed and no multi-gap structure is provided.

While the liquid crystal display apparatus of the reflective and transmissive type according to the eighth embodiment is shown as of the transmission type in FIGS. 17 and 18, in the present eighth embodiment, the counter electrode 120 made of ITO or the like is disposed immediately above the signal wiring line 116 and the scanning wiring line (gate line) 112. Therefore, jumping of a voltage variation from the signal wiring line 116 and the scanning wiring line (gate line) 112 into the counter electrode 120 can be prevented. Consequently, the variation at the signal wiring line 116 to the pixel electrode 125 disposed above the counter electrode 120 and the pixel electrode (ITO) 125 from the scanning wiring line (gate line) 112 by jumping in of the voltage variation can be suppressed. As a result, deterioration of the picture quality by flickering by horizontal and vertical crosstalk which appears in the liquid crystal display apparatus can be prevented.

<Ninth Embodiment>

Figure 19:
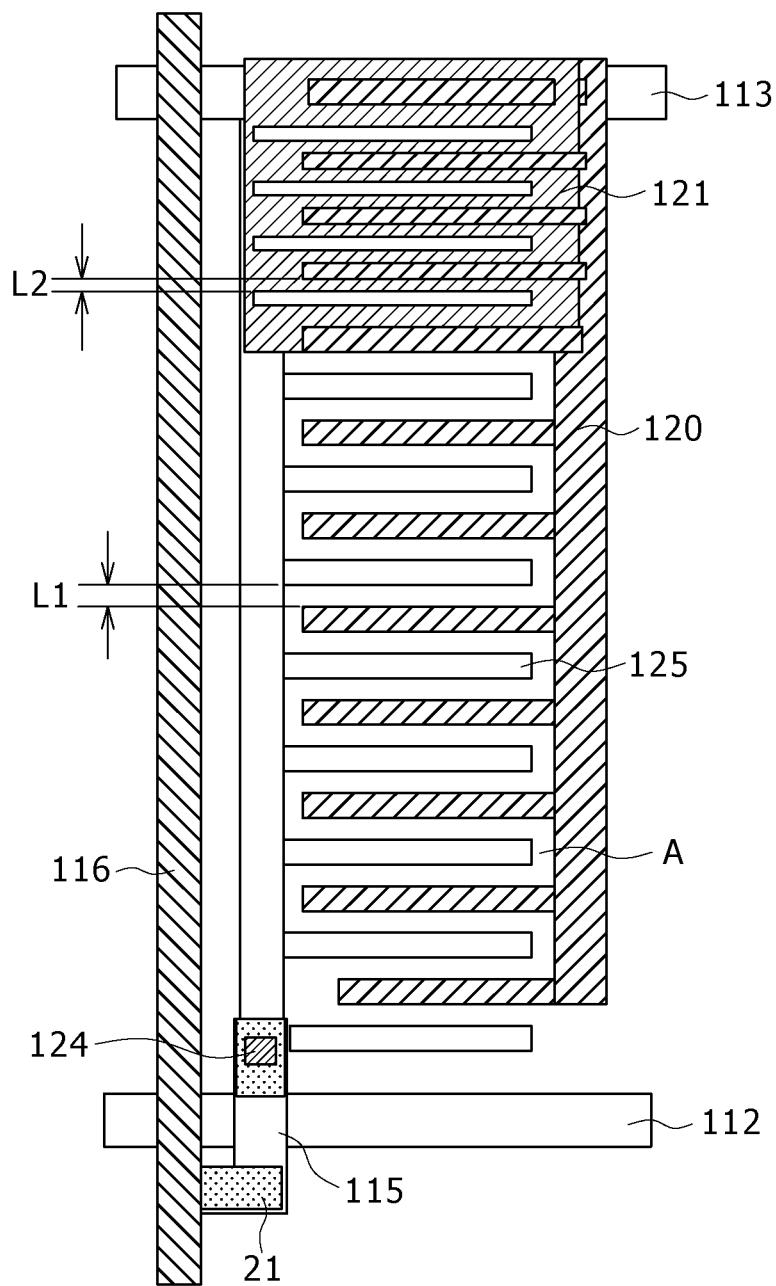
FIG. 19 is a plan view showing a layout of a liquid crystal display apparatus of the reflective and transmissive type according to a ninth embodiment of the present invention.
Figure 20:
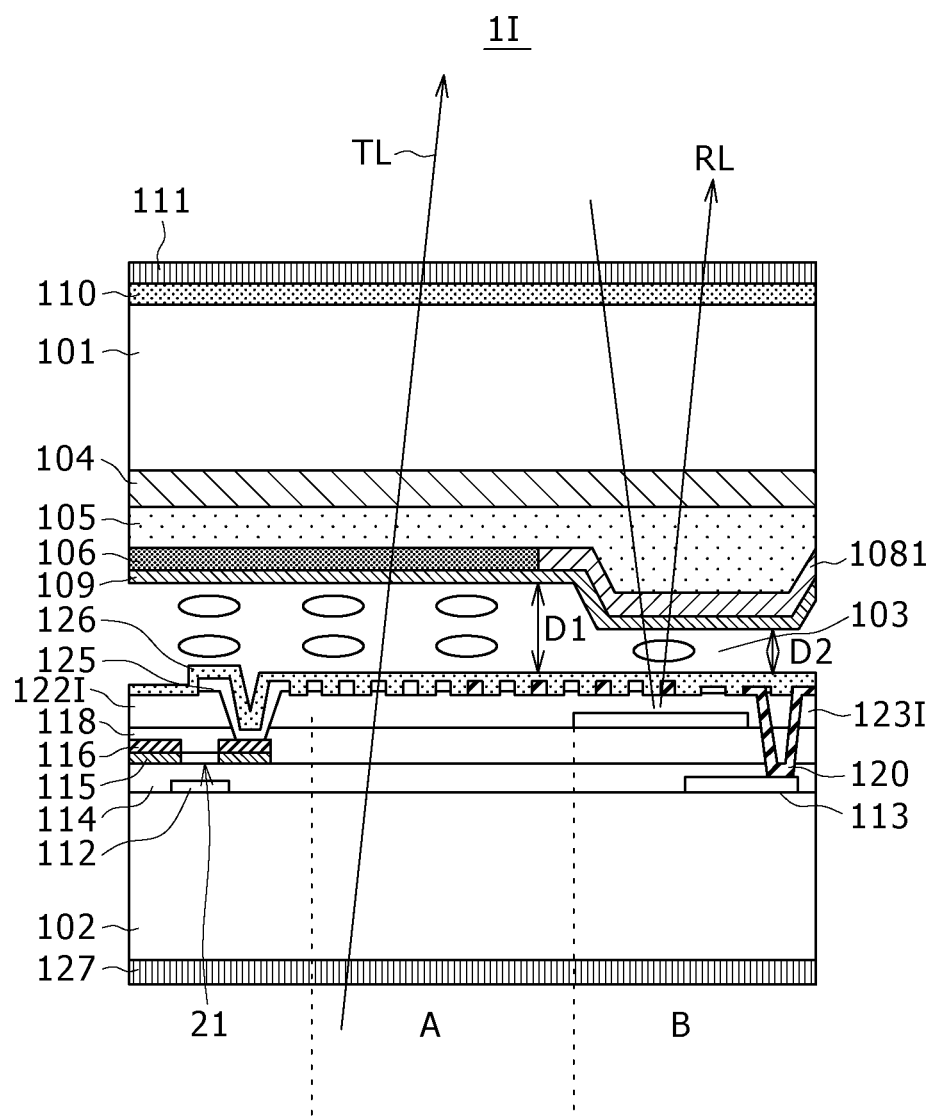
FIG. 20 is a cross sectional view of the liquid crystal display apparatus of the reflective and transmissive type of FIG. 19.

FIGS. 19 and 20 show a liquid crystal display apparatus of the reflective and transmissive type according to a ninth embodiment of the present invention.

Referring to FIGS. 19 and 20, the liquid crystal display apparatus 1I of the ninth embodiment is a modification to the liquid crystal display apparatus 1A of the first embodiment but is different in that it is formed not as that of the FFS type but as that of the IPS type.

On the first transparent substrate 101 side, a flattening film 108I is formed on the color filter 104, and a non-phase difference film 106 and a phase difference film 107 are formed in parallel on the flattening film 108I. Further, an orientation film 109 is formed on the non-phase difference film 106 and the phase difference film 107.

On the second transparent substrate 102 side, a reflecting film 121 is formed on the insulating film 114 in the reflection region B, and a counter electrode 120I and a pixel electrode 125I are formed in a comb-like shape on the first interlayer insulating film 122I and the second interlayer insulating film 123I such that they are opposed to each other.

Further, the line distance between the pixel electrode 125I and the counter electrode 120I is made different between the transmission region A and the reflection region B.

Further, the thickness L1 of the first interlayer insulating film 122I and the thickness L2 of the second interlayer insulating film 123I satisfy a relationship of $L2 \leq \frac{1}{2} \times L1$.

According to the present ninth embodiment, similar advantages to those of the first to eighth embodiments described hereinabove can be achieved.

In other words, according to the present ninth embodiment of the present invention, a liquid crystal display apparatus can be formed which has both functions of transmission and reception while it is of the IPS type.

Further, since a single driving voltage can be used for both of transmission and reflection, the number of power supply voltages can be reduced and a level shifter circuit in the driving circuit can be configured in a simple circuit configuration.

Further, a complicated pixel layout in transmission and reflection regions of the pixel section can be simplified. Therefore, a pixel layout of a high transmission factor and a high reflection factor can be achieved.

Further, since the driving circuits are handled with a simple power supply, the number of driving circuits can be reduced and the liquid crystal display apparatus can be fabricated at a reduced cost.

Further, an active matrix type display apparatus represented by the active matrix type liquid crystal display apparatus according to the embodiments described above is used as a display apparatus for OA apparatus such as a personal computer or a word processor and a television receiver. Further, the active matrix type display apparatus can be suitably used as a display section for a portable telephone set or a PDA with regard to which miniaturization and compaction particularly of an apparatus body are being proceeded.

Figure 21:
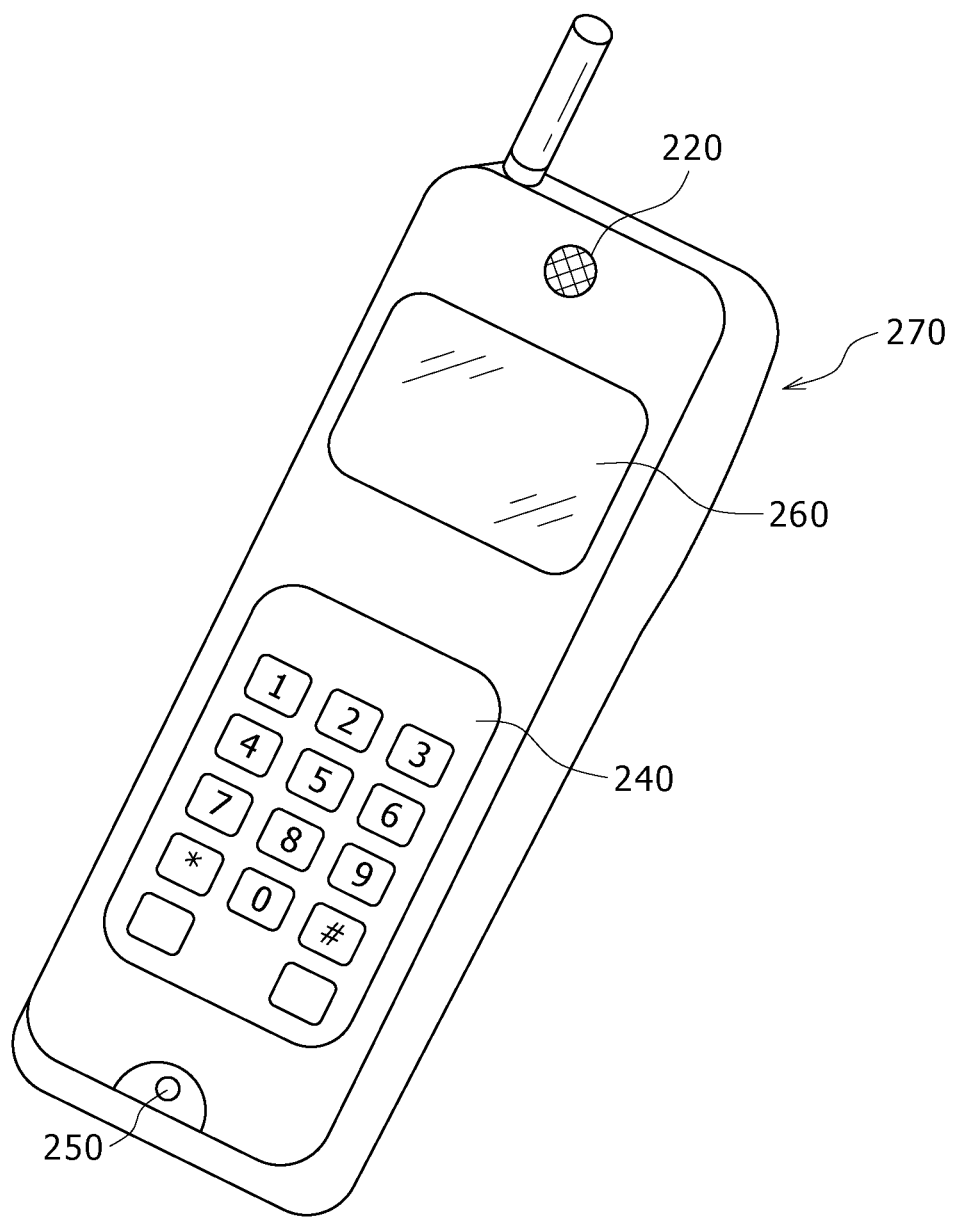
FIG. 21 is a schematic view of an electronic apparatus as a portable terminal in the form of a portable telephone set to which the present invention is applied.

FIG. 21 shows an outline of a configuration of an electronic apparatus such as, for example, a portable telephone set to which any of the liquid crystal display apparatus according to the embodiments described hereinabove can be applied.

Referring to FIG. 21, the portable telephone set 200 shown includes a speaker section 220, a display section 260, an operation section 240 and a microphone section 250 disposed in order from above on a front face of an apparatus housing 270.

In the portable telephone set 200 having the configuration just described, for example, a liquid crystal display apparatus is used for the display section 260, and any of the active matrix type liquid crystal display apparatus according to the embodiments of the present invention described hereinabove is applied as the liquid crystal display apparatus.

Where the active matrix type liquid crystal display apparatus according to any of the embodiments described hereinabove is used as the display section 260 in the portable terminal such as the portable telephone set, the dispersion of the output frequency of an oscillator which has some frequency dispersion can be suppressed so as to be within a predetermined certain guaranteed range. Further, a circuit block which is independent and does not rely upon the voltage or the frequency of an interface can be configured and controlled. Therefore, a circuit-integrated type liquid crystal display apparatus compatible with a low voltage and a high frequency of the interface can be implemented.

While preferred embodiments of the present invention have been described using specific terms, such description is for illustrative purpose only, and it is to be understood that changes and variations may be made without departing from the spirit or scope of the following claims.

What is claimed is:

1. A liquid crystal display apparatus wherein a transmission region and a reflection region are disposed in parallel, comprising:
a first substrate;
a flattening film carried on said first substrate;
a second substrate;
a liquid crystal layer disposed between said first and second substrates;
a pixel electrode carried on said second substrate;
a counter electrode;
an interlayer insulating film between said liquid crystal layer and said counter electrode, said interlayer insulating film including (a) a first insulating film of thickness t1 in said transmission region and (b) a second insulating film in said reflection region of thickness t2; and
a reflecting film in the reflection region and between said counter electrode and said interlayer insulating film;
wherein,
a portion of said counter electrode in said transmission region has a same film thickness as a portion of said counter electrode in said reflection region,
said first insulating film is in contact with said counter electrode in the transmission region while said second insulating film is in contact with said reflecting film in the reflection region,
said counter electrode, said interlayer insulating film, and said pixel electrode are configured to form a fringe field for driving molecules of the liquid crystal,
t1 and t2 are such that driving voltages for said transmission region and said reflection region can be substantially equal to each other,
the thickness t1 of said first insulating film is uniform over a region extending over said entire counter electrode in said transmission region, and
the flattening film is provided in said reflection region of said first substrate to adjust a gap between said first and second substrates and create a difference in a thickness of the liquid crystal layer in said reflection region that is less than a thickness of the liquid crystal layer in said transmission region.

2. The liquid crystal display apparatus according to claim 1, wherein t1 of said transmission region is greater than t2 of said reflection region.

3. The liquid crystal display apparatus according to claim 1, wherein,
a ratio t1/t2 with respect to film thickness has a value equal to or higher than 0.15.

4. The liquid crystal display apparatus according to claim 1, wherein a relative dielectric constant of said first insulating film is different than that of said second insulating film.

5. The liquid crystal display apparatus according to claim 4, wherein the film thickness of said first insulating film is not less than twice that of said second insulating film, and a phase difference film is formed on said reflection region of said first substrate.

6. The liquid crystal display apparatus according to claim 1, wherein a relative dielectric constant of said first insulating film and that of said second insulating film are set to different values from each other so that the driving voltages for the transmission region and the reflection region may be substantially equal to each other.

7. The liquid crystal display apparatus according to claim 6, wherein,
t2 is greater than t1, and
the thickness of said liquid crystal layer in the reflection region is smaller than that of said liquid crystal layer in the transmission region.

8. The liquid crystal display apparatus according to claim 1, wherein said interlayer insulating film has an overlapping portion over which one of the first insulating film and the second insulating film extends into the other one of the transmission region side and the reflection region side, and a relative dielectric constant of the first insulating film and that of the second insulating film are set to different values from each other so that the driving voltages in the transmission region and the reflection region may be substantially equal to each other.

9. The liquid crystal display apparatus according to claim 1, wherein a transistor is formed on said second substrate and is connected at a gate electrode thereof to a gate line, at a first diffused layer thereof to a signal line and at a second diffused layer thereof to said pixel electrode, and said counter electrode is formed in such a manner as to have an overlapping portion with at least one of the gate line and the signal line.

* * * * *